US010417655B2

(12) United States Patent
Mazuera

(10) Patent No.: US 10,417,655 B2
(45) Date of Patent: Sep. 17, 2019

(54) COUPON REGISTRATION AND VALIDATION SYSTEM

(71) Applicant: VTU de Colombia S.A., Bogota (CO)

(72) Inventor: Johannes Kling Mazuera, Bogota (CO)

(73) Assignee: VTU de Colombia S.A., Bogota (CO)

( * ) Notice: Subject to any disclaimer, the term of this patent is extended or adjusted under 35 U.S.C. 154(b) by 874 days.

(21) Appl. No.: 14/879,783

(22) Filed: Oct. 9, 2015

(65) Prior Publication Data

US 2017/0103408 A1 Apr. 13, 2017

(51) Int. Cl.

*G06Q 30/00* (2012.01)
*G06Q 30/02* (2012.01)
*H04L 29/06* (2006.01)

(52) U.S. Cl.

CPC ....... *G06Q 30/0225* (2013.01); *H04L 63/083* (2013.01); *H04L 63/102* (2013.01); *H04L 2463/102* (2013.01)

(58) Field of Classification Search

CPC .................................................... G06Q 30/225
See application file for complete search history.

(56) References Cited

U.S. PATENT DOCUMENTS 5,761,648 A 6/1998 Golden et al.
5,970,469 A 10/1999 Scroggie et al.
6,185,541 B1 2/2001 Scroggie et al.
6,321,208 B1 11/2001 Barnett et al.
6,336,099 B1 1/2002 Barnett et al.
6,885,994 B1 4/2005 Scroggie et al.
7,401,032 B1 7/2008 Golden et al.
8,050,969 B2 11/2011 Golden et al.
8,370,200 B2 2/2013 Golden et al.
8,700,457 B2 4/2014 Craft
8,712,830 B2 4/2014 Barnett
9,785,973 B2 * 10/2017 Tollinger .............. G06F 17/212
9,864,958 B2 * 1/2018 Barnes, Jr. ............. G06Q 10/02
9,953,334 B2 * 4/2018 Heitmueller ......... G06Q 20/387
2001/0001145 A1 5/2001 Barnett et al.
2002/0095335 A1 7/2002 Barnett et al.
2002/0120496 A1 8/2002 Scroggie et al.
2002/0178051 A1 11/2002 Golden et al.
2002/0198777 A1 12/2002 Yuasa (Continued)

OTHER PUBLICATIONS

Web Services—Theory and Practices, Guruge, Digital Press, 2003, pp. 232-270.*
MMS, Ralph, John Wiley, 2004, pp. xv-xix, 28-30, 188, 320,339.*

*Primary Examiner* — Jay Huang
*Assistant Examiner* — Michael I Ezewoko
(74) *Attorney, Agent, or Firm* — The Juhasz Law Firm

(57) ABSTRACT

In an illustrative system and method for disbursing resources includes (i) receiving a user request for a coupon, the user request including user criteria; (2) matching the received user criteria with a target audience criteria; (3) transmitting a coupon to a user, the coupon including a unique password based upon a match of the received user criteria and the target audience criteria; (4) receiving a request for registration of the unique password of the coupon with the user; (5) receiving a request for validation of the unique password of the coupon; and (6) authorizing the user to access the network resource associated with the coupon upon validation of the unique password.

20 Claims, 22 Drawing Sheets

(56) References Cited

U.S. PATENT DOCUMENTS

| | | | |
|---|---|---|---|
| 2003/0200146 A1 | 10/2003 | Levin et al. | |
| 2004/0054575 A1 | 3/2004 | Marshall | |
| 2005/0149404 A1 | 7/2005 | Barnett et al. | |
| 2005/0149405 A1 | 7/2005 | Barnett et al. | |
| 2006/0180664 A1* | 8/2006 | Barrett | G06Q 20/32 235/383 |
| 2008/0010114 A1 | 1/2008 | Head | |
| 2008/0065490 A1 | 3/2008 | Novick et al. | |
| 2011/0010229 A1 | 1/2011 | Ow | |
| 2011/0119122 A1 | 5/2011 | Padam et al. | |
| 2011/0302015 A1 | 12/2011 | Summers et al. | |
| 2012/0185319 A1 | 7/2012 | Visger | |
| 2012/0215611 A1 | 8/2012 | Korson et al. | |
| 2012/0303440 A1 | 11/2012 | Ow | |
| 2013/0041725 A1 | 2/2013 | Moore et al. | |
| 2013/0073372 A1 | 3/2013 | Novick et al. | |

* cited by examiner

COUPON REGISTRATION AND VALIDATION SYSTEM

FIELD OF THE INVENTION

The present application relates generally to disbursement of resources via an electronic network of users. More particularly, the present application pertains to disbursement of promotional coupons for items such as consumer goods, financial resources, insurance resources, services, and the like, that include a unique password that must be registered by the user to use the coupon and presented at a point of sale to redeem the item.

BACKGROUND OF THE INVENTION

Networked electronic coupon management systems are expanding for managing electronic coupons. Such systems may include for example tightly integrated database, application server, and client components facilitating performing electronic coupon definition, issuance, and redemption operations. The operations may include creating electronic coupons, wherein each electronic coupon includes a unique coupon ID, creating customer accounts, wherein each customer account comprises a unique customer ID; creating manufacturer accounts, wherein each manufacturer account comprises a Unique ID; and creating retailer accounts, wherein each retailer account comprises a unique retailer ID; and assigning a unique electronic coupon ID to a unique customer ID. Such systems may validate the electronic coupon with a product purchase transaction by a customer associated with the unique customer ID. Furthermore, funds transfers associated with the product purchase transaction may be tracked, and historical transactional level data may be maintained for all customer, manufacturer and retailer accounts.

There is a need for improvement in efficiency of a networked electronic coupon management system. What is needed is a better way to integrate users to target marketing campaigns that are deployed and to more tightly couple a user to an issued coupon to ensure the integrity of the registration and redemption of the coupon by the targeted user.

SUMMARY OF THE INVENTION

In an illustrative method, the method for disbursing resources includes (i) receiving a user request for a coupon, the user request including user criteria; (2) matching the received user criteria with a target audience criteria; (3) transmitting a coupon to a user, the coupon including a unique password based upon a match of the received user criteria and the target audience criteria; (4) receiving a request for registration of the unique password of the coupon with the user; (5) receiving a request for validation of the unique password of the coupon; and (6) authorizing the user to access the network resource associated with the coupon upon validation of the unique password.

In an illustrative system, a network resource disbursement system includes a network resource registry including resource configuration data associated with a network resource. The resource configuration data includes a target audience code including target audience criteria for disbursing a coupon associated with the network resource to a target audience and a password associated with the coupon for accessing the network resource. A network user registry includes user configuration data associated with a user. The user configuration data includes user criteria for matching with the target audience criteria for determining whether to disburse the coupon associated with the network resource to the target audience. An authorization server is configured for (i) receiving a user request for a coupon, (ii) matching the received user criteria with the target audience criteria; (iii) transmitting a coupon including a unique password based upon a match of the received user criteria and the target audience criteria; (iv) receiving a request for registration of the unique password of the coupon with the user; (v) receiving a request for validation of the unique password of the coupon, and (vi) authorizing the user to access the network resource associated with the coupon upon validation of the unique password.

In an alternate illustrative method, the method for generating and redeeming coupons includes configuring a computing device with a network resource registry. The network resource registry includes resource configuration data associated with a network resource, the resource configuration data including a target audience code including target audience criteria for disbursing a coupon associated with the network resource to a target audience and a password associated with the coupon for accessing the network resource. A network of consumer users are established on the registry, the registry including user configuration data associated with a user, the user configuration data including user criteria for matching with the target audience criteria for determining whether to disburse the coupon associated with the network resource to the target audience. A plurality of coupons are prepared for transmission to a user upon request for a coupon, the user request including user criteria. The coupon transmitted to the user includes a unique password based upon a match of the received user criteria and the target audience criteria. The coupon is presented to a kiosk for redemption. Upon validation of the unique password, the user is authorized to access the network resource associated with the coupon These and many other aspects of the present disclosure are discussed in greater detail below.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which

FIGS. 8A-1, 8A-2, 8A-3, 8A-4, 8B-1, 8B-2, 8B-3, 8B-4, 8C1, 8C-2, 8C-3 and 8C-4 depict a flow chart of an illustrative process of the coupon system of this disclosure.

DETAILED DESCRIPTION

Figure 1A:
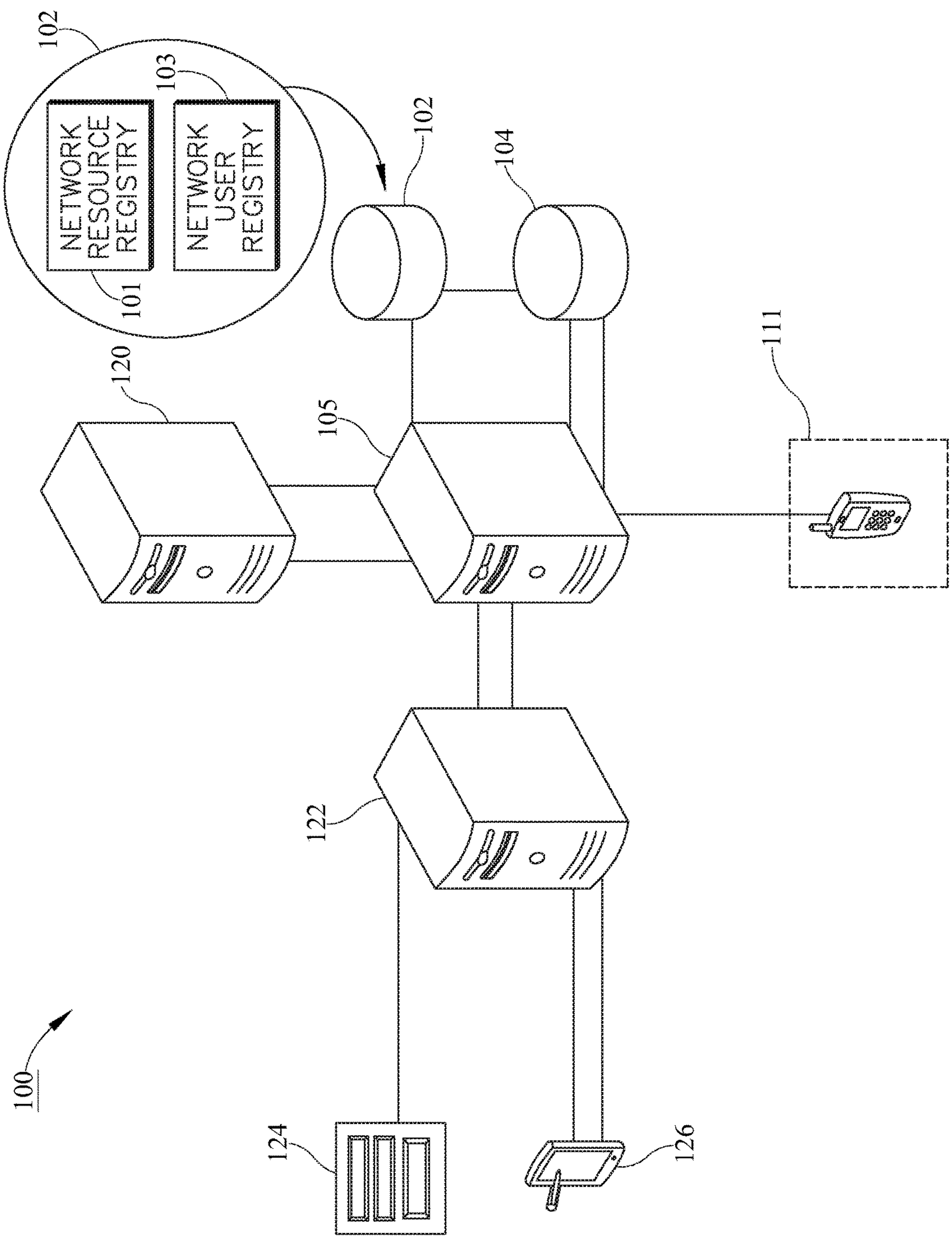
FIG. 1A depicts an overview of a coupon program system of this disclosure.

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, with a wide variety of different configurations, all of which are explicitly contemplated herein.

Briefly stated, technologies are generally described for a coupon system which is illustrative referred to herein as, "D for Discount." D for Discount is targeted to deliver coupons daily to users for accessing a resource, e.g., buying items. Those coupons may be delivered to mobile phones, such as feature phones or smart phones. Delivery of the coupons may occur via SMS (short message service) or via a mobile application ("app") installed on the phone or other personal portable device, provided the application is available for the particular mobile device. The application need not be complicated. The application may simply be a client downloaded to the user's phone or other mobile device that provides an interface. The interface is illustratively suitable for communicating with an authorization server that is described below. The client application may contain sufficient software for verifying the user's identity, password, coupon code and the like. The application speeds up the process of identifying the user and verifying that all steps for presenting and redeeming the coupon are correctly accomplished. The coupons are individualized, so as to be unique for each consumer. In one embodiment, each coupon has a unique code, which tracks back to the end user or consumer with the coupon. Using a system for generating a unique coupon code for each recipient or user, the system is able to generate relevant data of usage, consumption, and redemption of both the user and store historical data on coupons that are disbursed through the coupon system of this disclosure.

This system is available to, and may be most valuable to, a variety of companies in the consumer goods industry. An example may be a company having a high percentage of its stores as kiosks or as "Mom & Pop" stores. Using the "D for Discount" system, these companies can deliver discounts and promotions to the end user, who may also be a customer of the kiosk or "Mom & Pop" store. Through the disclosed system, merchants and vendors, such as consumer goods manufacturing companies, may gain knowledge of their customers via redemption of the coupons. Information on the consumer, such as age, gender, location and other demographics, may be gathered by the system of this disclosure prior to the redemption and may be used to design a campaign for a coupon. The system associates a unique password with each coupon that must be registered by the user to use the coupon and presented at a point of sale (POS) to redeem the item. This provides a good way to integrate users to target marketing campaigns that are deployed and to more tightly couple a user to an issued coupon to ensure the integrity of the registration and redemption of the coupon by the targeted user.

Network for Mobile Coupon Program

A network suitable for the mobile coupon program is depicted in FIG. 1A. The network 100 is illustratively decentralized and may include a network resource registry 101, a network user or consumer registry 103 and an authorization server or computer 105. The network also includes a kiosk 111 or a plurality of remote kiosks or stores. The elements of the network may communicate over a private enterprise network, as shown. Alternatively, communications may be via a public communications network, e.g., the internet, or a combination of public and private networks. Communication may through hard wire or wireless connections.

In either embodiment, the authorization server is in communication with the network resource registry 101 and the network user registry 103. Users who are customers (not shown in this figure) may communicate with the network user registry 103 in order to register with the network and receive coupons for redemption. Users who are vendors (not shown in this figure) may communicate with the network resource registry 101 in order to register items they would like to make the subject of a coupon marketing campaign as well as the terms and conditions for that marketing campaign as described below. The coupons for a coupon marketing campaign are generated by coupon generator 104. Coupon generator 104 is a computing device configured to generate coupons as explained below.

When a customer user wishes to purchase an item or redeem a coupon, the user interfaces with the system through a user interface 122. User interface 122 is a computing device configured to enable a user to communicate with the authorization server 105. More specifically, the customer user illustratively registers via user interface 122 with authorization server 105 over a browser on a computing device 124. The computing device on which the browser may be displayed may be a wireless device such as a smartphone, laptop, Tablet, PDA or the like. Alternatively, the computing device on which the browser may be displayed may be a personal computer. Upon registration and authentication of the customer user by the authorization server, the user initiates a request for coupons.

The authorization server 105 is central to the coupon network system. The authorization server is configured for transmitting information to and from the network resource registry 101, the network user registry 103, and each of the participating stores, kiosks and mobile devices that are part of the coupon network. In one embodiment, the authorization server is configured to receive a request for access to the network resource registry or to a particular network resource (vendor or provider). To properly access the authorization server, the request from the user includes an indication of the resource that is sought, as well as an authentication password that is associated with the user upon registration of the user with the coupon system. The authorization server is configured to determine whether the user and authentication password match and that the user with the authentication password is authorized to access the desired network resource, or is authorized for other interactions with the authorization server, the network user registry or the network resource registry. The authorization server may be a single computing device, a server, or may be a network of computing devices or servers located in a single location or in a variety of decentralized locations.

User Registration in the Mobile Coupon Program

Still referring to FIG. 1A, the customer user registration process in the system may be accomplished in several ways, in order to assure that the largest amount of people possible can enter the program. A key feature in registering is the entering of basic contact information and consumer or user data that is suitable for characterizing and segmenting the consumers and users. This information provides the raw data by which the system may segment the population in order to provide targeted mobile coupon campaigns, i.e., audience targeting. The data entered by the prospective user may include, without limitation, the following:

Name
ID number
Mobile number
Date of birth
Gender
City in which he or she lives
Neighborhood in which he or she lives
Socioeconomic level index
Contact email
Express authorization for the SMS delivery, and use of personal data (Terms & Conditions)

The customer user registers with the coupon system of this disclosure using the above data and like data. The specific data required by the system is a design choice based on the system. This and additional data as desired may be stored in the network user registry 103. The Network User Registry need not be complicated and may be simply a computer configured to collect, aggregate, and correlate a database of user information, typically supplied by the customer users themselves. The network user registry may be a single computing device, such as a server, or may be a network of computing devices or servers located in a single location or in a variety of decentralized locations. In either case, the computing device is configured with software that configures the computing device to the intended application. The network user registry is in communication with the authorization server 105.

Additional data may also be entered for each user, e.g., data to assist the coupon program clients, who may be manufacturers or other producers of goods or resources. This data may include a record of participation in the program (e.g., the number of times that a customer user accessed the system, registered a coupon, and validated a coupon at a point of sale), percentages of coupon offers that are accepted by the user and used to purchase a good or a resource, and the like.

Figure 2:
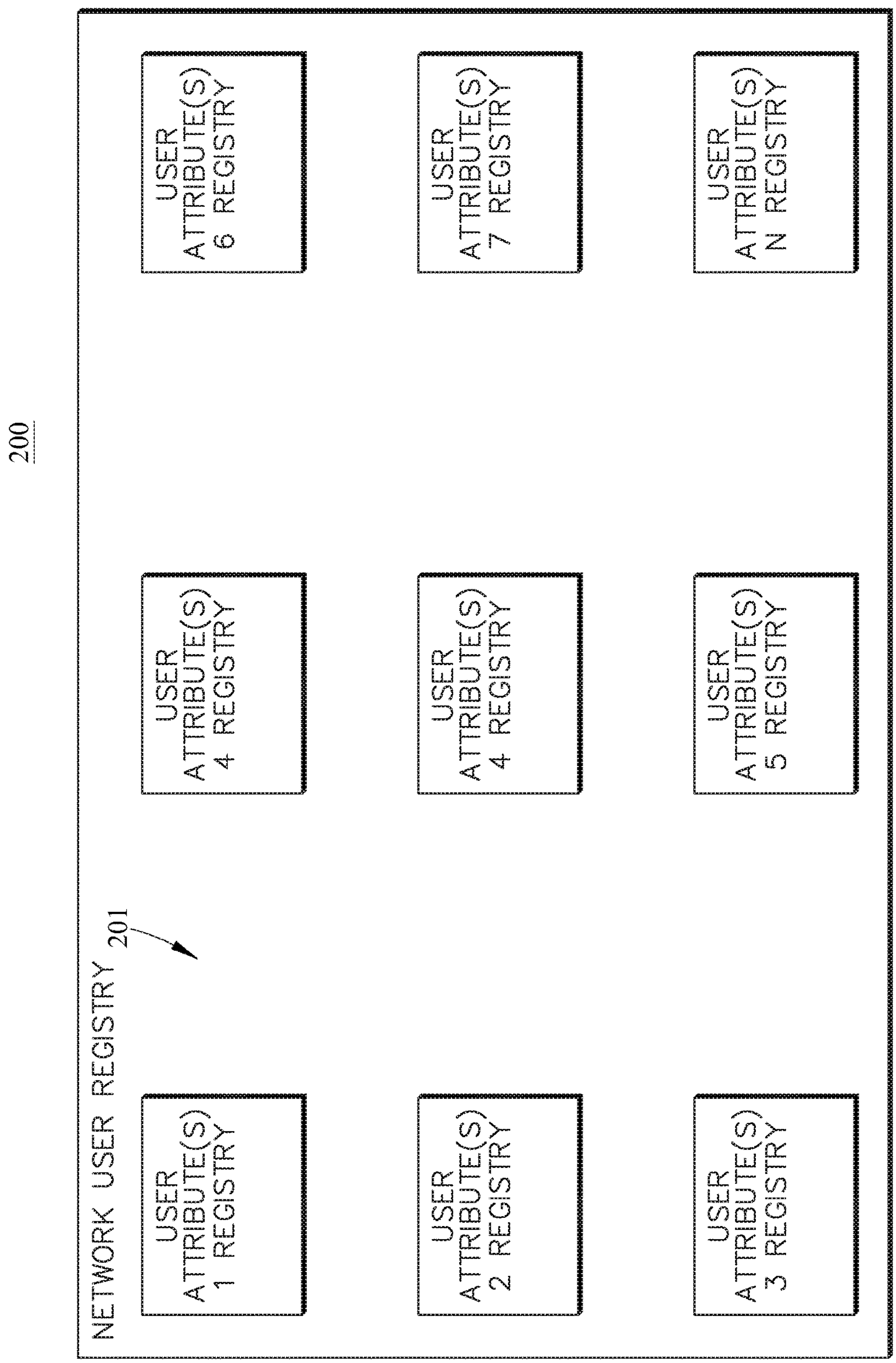
FIG. 2 depicts a structure of a network user registry useful for the coupon program.

Network User Network Resource Registry 200 is depicted in FIG. 2 and may simply be a computer device configured to collect, aggregate, and correlate data on items such as consumer goods, financial resources, insurance resources, services, and the like, that are the subject of a coupon program according to this disclosure. The Network Resource Registry is in communication with the authorization server. Network Resource Registry 200 includes user attribute information on a plurality 201 of users, shown as user 1, user 2 . . . through user n. The information stored may include user attributes or characteristics, as discussed above.

Once the customer user is registered in the program, he or she will receive a userID and an authentication password. The userID is a unique identifier that is associated with a customer user. The authentication password is a unique password that is used to authenticate a customer user with the coupon system of this disclosure. The userID and authentication password will enable him or her to enter the website or the application on his or her mobile phone or other mobile device, browse the different coupons, request some of them, and change his or her contact or profile information. The user may also access the network user registry 103 in order to de-register from the mobile coupon program. All of these events may occur through computing device 124 as depicted in FIG. 1A.

To obtain the largest number of users possible and taking into account the difficulties for some potential users to connect to the internet, the system illustratively provides for different channels of registration, which will complement the online registration. According to that premise, the system may illustratively have two different ways to register end users:

1. Physical registration: In this form of registration, the user may register using physical forms. This form can be distributed in highly-trafficked areas or places in the cities having a useful concentration of stores or kiosks that participate in the coupon program. The form may also be found in kiosks or Mom & Pop stores that are part of the program, in order for potential users to register on-site. The user customer simply fills out the form using a pen or pencil and provides the form to the vendor. The vendor will then enter the user information into the system through a computing device such as computing device 124 depicted in FIG. 1A.

2. Virtual Registration: In this form of registration, the customer user can register online from the web page, such as shown on computing device 124 in FIG. 1A. This web register may also include various information fields, and allows the customer user to request authorizations. Once the registration is complete, the user may receive confirmation through the web browser. Alternatively, the system may send the customer user confirmation using SMS messaging to a mobile device that the customer user registered on the computing device 124. The system may also send the customer user confirmation through a smartphone application. Once the user registers for the mobile coupon program he or she will receive different coupons for resources, such as consumer goods. The coupons may be received through the web browser on the computing device 124 shown in FIG. 1A. The users can redeem the coupons in any store or kiosk affiliated with the virtual coupon program.

In the illustrative example, the computing device 124 includes a solicitation module which may be a client on the computing device 126 that configures the computing device for registering the coupon with the system as previously described.

Before a customer user may use a coupon that may populate the web browser illustrated on computing device 124 shown in FIG. 1A, the customer user must register the coupon with the authorization server. This is illustrated in FIG. 1A by computing device 126 whereby the customer user may enter the coupon that the user may select for redemption along with the password that appears on the selected coupon. In the illustrative example, the computing device 126 includes a registration module which may be a client on the computing device 126 that configures the computing device for registering the coupon with the system as previously described.

It will be appreciated that the solicitation module client on computing device 124 and the registration module client on computing device 126 may both reside on the same computing device—e.g., computing device 124 or 126.

Figure 1B:
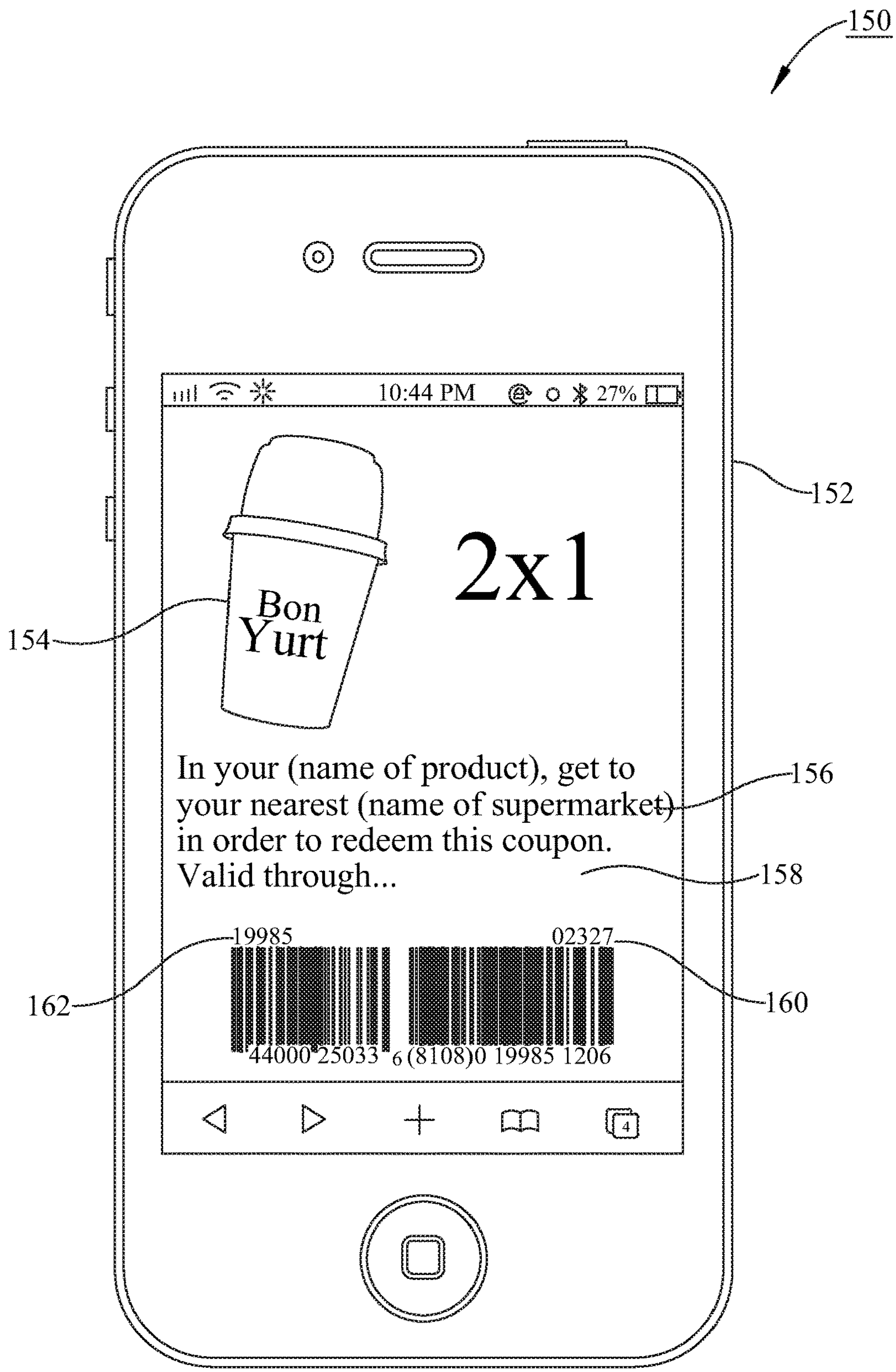
FIG. 1B depicts a coupon generated by the coupon program system of this disclosure.

FIG. 1B depicts an illustrative coupon 150 generated by the system of this disclosure. The coupon is displayed on a smart phone device and includes a depiction of the item 154, illustratively, an item of yogurt. The coupon also includes an indication of the store 156 where the coupon may be redeemed. In the illustrative example, the store is the Exito. The coupon also includes an indication of how long the coupon will be valid 158. In the illustrative example, the coupon will be valid through Jun. 15, 2014. The coupon also includes a barcode 160 of the item so that when the coupon is scanned, the system will recognize the network resource that is being redeemed upon presentment of the coupon, namely, the item of yogurt. Finally, the coupon includes a unique password 162 depicted as 19985 in the illustrative coupon displayed. This unique password 162 is the password that is registered by the user on the computing device 126, more specifically, for example, the registration module client residing on the computing device, shown in FIG. 1A as previously explained. It is also the password that is validated by a validation module client residing on a computing device at kiosk 111 depicted in FIG. 1A as explained below.

Advantageously, through this process, this unique password associated with the coupon is tightly coupled with the user identity (e.g., userID) to ensure that the customer user who qualified for the coupon under the marketing campaign is the user who actually redeems the coupon at the store, the Exito in the illustrative example. In effect, the coupon is uniquely associated with the user identity (i.e., the signature of the customer user) to provide this tight coupling. This tightly coupled coupon is decoupled illustratively at the kiosk upon presentment by the customer of both the coupon including the unique password and some form of identification that verifies the user. The verification may be in the form of the userID. Alternatively, it may be in the form of some other form of identification. When that occurs, the signature of the coupon has been validated and the item represented by the coupon may be redeemed by the customer user.

Store Registration in the Mobile Coupon Program

The stores or kiosks that are part of the program are able to redeem mobile coupons sent from the program's platform. In order for a store to be able to redeem those coupons, the store should be registered in the program, and this can be done in several ways. Each store may register as a "D for discount" ally. The stores that are part of the "D for discount" network may participate in the program of mobile "D for Discount" coupons if they wish, but participation is not mandatory. Further identification of a store as a redemption store is provided to these members. Stores or kiosks may participate in the program using a mobile device, such as a mobile phone, or a plurality of mobile devices, in a manner similar to a store having a plurality of check-out lanes. Alternatively, a tablet or pad-type computer with communications capabilities may be used. In addition, a point-of-sale (POS) terminal, mobile or stationary in the store, may be used for coupon validation or redemption.

Figure 3:
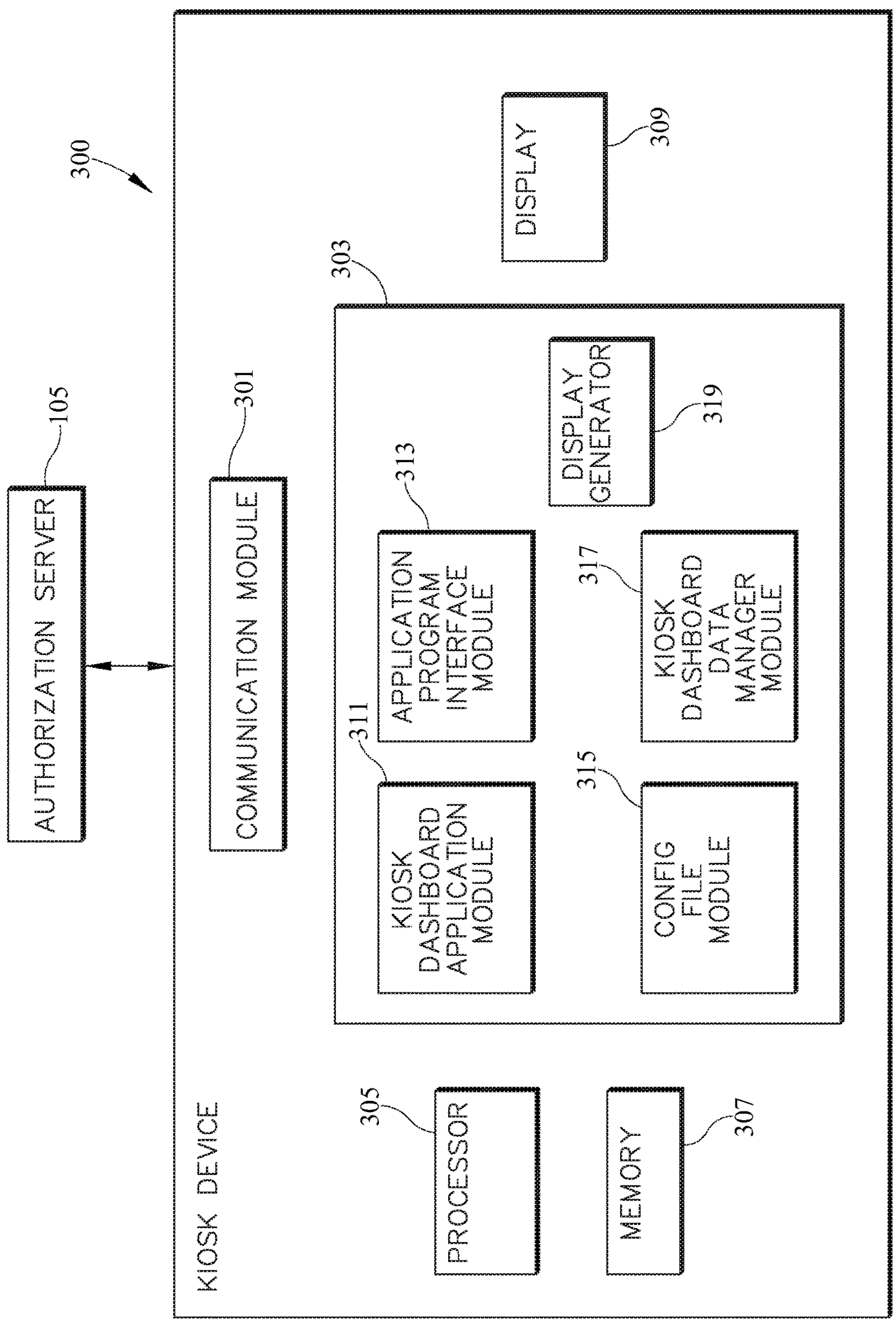
FIG. 3 depicts an architecture on a computing device at a kiosk or store participating in the coupon program.

An example of a mobile phone or device suitable for a store or kiosk to participate is depicted in FIG. 3. Communication device or mobile phone 300 is suitable for communicating with the program's authorization server 105 as described previously. Communication device 300 may include a communication module 301, such as a cellular telephone receiver/transmitter or a wireless internet interface. Communication device 300 may also include a microprocessor 305 and memory 307, as well as a display or interface 309. The mobile phone may include interfaces suitable for both output and input, e.g., the interface may be capable of scanning or otherwise interfacing with a coupon, a bar code, a QR code, or other inputs suitable for the coupon registering and redeeming. The mobile phone provided by the network may have a Java ME or J2ME mobile application ("app") installed for reading and redeeming coupons. J2ME is also known as Java ME or Java 2 Platform, Micro Edition mobile application. This may be a part of a client 303 which may include an application program interface module 313, a configuration file module 315, a kiosk dashboard application module 311, a kiosk dashboard data manager module 317, and a display generator 319.

Alternatively, each store may register for redemption using unstructured supplementary service data (USSD). A store that is not willing to be part of the "D for Discount" network, but still desires to redeem coupons of the mobile coupon program, may participate via a USSD channel. This channel allows mobile phones of different categories to redeem such coupons. The requirement to be eligible for participation in coupon redemption is to register for the program for a selected line of resources, and to provide certain information about the store or kiosk as part of the registration process.

Network Resources and Registration

The coupon system has been designed to process and redeem coupons for everyday consumer items, such as items available at venues such as grocery stores, Mom & Pop stores and mobile kiosks, as well as other locations. Thus, the coupon registry may prepare and distribute coupons for consumer goods, e.g., food items and non-food items. The coupon network has also been designed to handle a much greater variety of resources. In general, a resource is an item that may be exchanged from one person to another, whether the person is a natural person or a legal person. Resources may include goods or services, and may include items for which a coupon or "bargain" token may be used.

Figure 4:
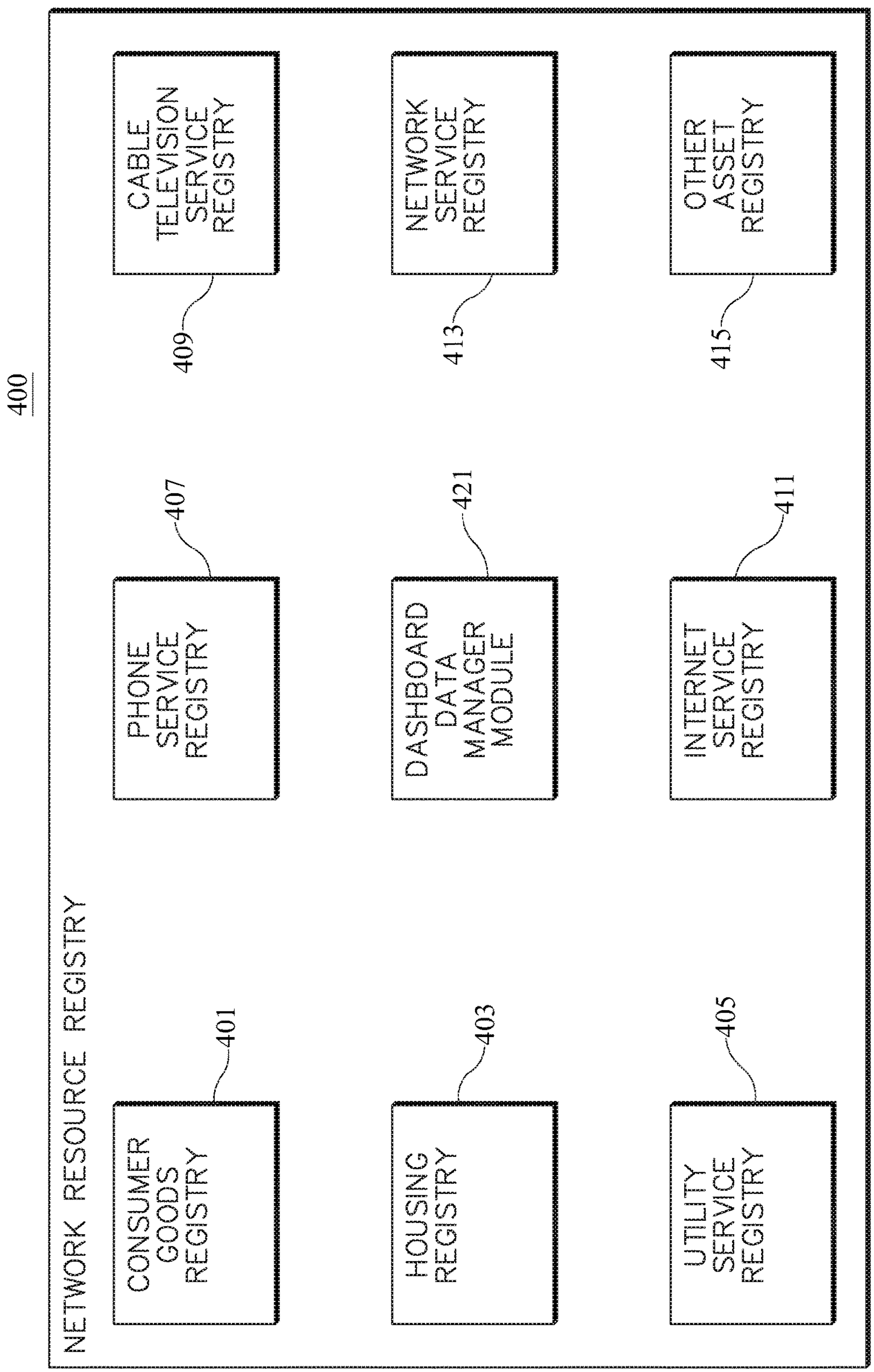
FIG. 4 depicts a network resource registry for the coupon system.

Resources that are available through the coupon program described herein are registered with a network resource registry 400, as shown in FIG. 4. Illustratively, network resource registry 400 is a computing device configured to collect, aggregate, and correlate network resource data for use by the system of this disclosure. There may be a separate register or registry for each type of goods, as shown. Network resource registry may be a single computing device, e.g., a server, or may be a network of computing devices or servers located in a single location or in a variety of decentralized locations for storing and processing resource registration for the network. Each of the resource registries in FIG. 4 may reside on a single computer, a server, a plurality of networked computers or servers, or the like, with one or more memories for storing the information in a non-transitory manner.

The resource registry may include a first consumer goods registry 401 for registering providers of consumer goods. Other registries may accommodate other types of resources, such as a housing registry 403. A housing registry 403 may assist landlords with available apartments or living space and may also help tenants seeking housing. A utility service registry 405 may assist providers of utilities, e.g., electricity, water, sewage, rubbish services, natural gas, or other utilities. A phone service registry 407 may register providers of wired or wireless telephone services, and may include providers of related services, e.g., SMS providers, e-mail forwarding services, and the like.

The coupon system described herein is designed to aid in the distribution of a wide variety of resources, as mentioned above. Resources may be broadly defined as goods or services that can be exchanged between persons using information and coupons as described herein. Thus, as noted above, and without reservation, resources may include groceries, non-food items, telephone services, financial services, communications services, housing services and so forth. Financial services are included, such as insurance and banking services—e.g., a bank or a credit union may offer a "sale" on loans, such as a lower interest rate, a longer term for the loan, fewer restrictions on borrower requirements, and the like. Money may be exchanged also, e.g., a person may pay bills or purchase services using the coupon program. The coupons that are generated are unique to both the user and the item of exchange, i.e., the electronic coupon includes coded information relating to the client (vendor), the user (customer or consumer), the product or resource, and so forth.

With a food item coupon, the user may go to a store that is affiliated with the coupon program and present the coupon to a clerk or point-of-sale terminal. The point-of-sale terminal may be a secure mobile communication device suitable for communicating with the authorization server of the coupon network. After the coupon is validated and accepted, the user may take delivery of the food or other item or the store or clerk may deliver the food or other item as directed by the customer or user. For financial services, in one example, the user may approach a banking kiosk or insurance vending machine and present the coupon to a clerk or to a point-of-sale terminal. The clerk or terminal may then check the coupon and when the coupon is determined to be valid, transfer funds to the bank or insurance company from a financial account of the user. In a similar manner, if the user is borrowing money, the clerk at the kiosk may validate the coupon and then deliver cash to the user or cause a transfer of funds from the financial institution to an account of the user. The account of the users and other particular information on a user necessary for a particular transaction would be the kind of attribute information described in FIG. 2 that may be entered by a customer user in connection with a particular program executed by the system.

Other registries or registration modules in the network resource registry 400 may accommodate cable television services with their registry 409. This registry may include television as well as other audio-visual entertainment services, e.g., video games, movie subscription services, and the like. An internet service registry 411 may assist internet service providers with an additional marketing venue. A registry for network services 413 may be used to register providers of other network services, e.g., financial services, information services, and so forth. This may include banking services, lending services, and the like. Other resources or assets may be registered in an "other" registry 415. This may include, for example, an insurance registry for handling insurance services from insurance companies or insurance agents. Thus, the resources for which coupons may be prepared and redeemed may include all these and many others, only a few of which are mentioned specifically as examples herein. The network resource registry 400 may also include a dashboard data manager module 421, as depicted in FIG. 4. The dashboard manager module includes a dashboard data manager, used to control input, storage, tracking, output and recordal of data to and from the network resource registry 400. The dashboard manager module assists an administrator of a program in designing, developing, and implementing a coupon program in accordance with the system.

Both customer users and vendor user (e.g., vendors) may wish to have additional security measures for transactions because of the possibility of high-value exchanges that may be accommodated by embodiments of this disclosure. Accordingly, additional security measures may be used with any program executed by the system of this disclosure, including, but not limited to, biometric identification, personal questions and answers, encryption of information exchanges, and the like. For example, a user may be required to present a finger, a thumb or an iris of the user's eye for identification at the store or kiosk. The clerk or point-of-sale terminal may compare the finger print, thumb print or iris to an image or to digital data in the user registry to confirm the identity of the user. Alternatively, a computer program may compare the user's biometric data with data on file for the user and let the clerk know if there is a match. If additional passwords or security questions-and-answers are used, the clerk or terminal may user this additional data to verify the identity of the user presenting the coupon and expecting to complete a transaction or to take delivery of a resource. Encryption may also be used for all exchanges of information between the user or customer and elements of the coupon program, including the network user registry, the authorization server and for kiosk and store communications. Encryption may also be used between system clients and the network resource registry, the network user registry, the authorization server and stores or kiosks.

Coupon Generation

The coupon generation process of the system of this disclosure is the process whereby the codes of the different coupons are generated. Each code will be assigned to a particular consumer or end user, and cannot be used for delivery to a different end user. These coupons cannot be used for a different ongoing campaign in order to avoid misunderstandings and replication of coupons. These coupons are generated in a CouponServer that generates the different codes with an algorithm and provides a password for each one; they are stored in the platform until they are assigned to an end user. This CouponServer may be coupon generator 104 depicted in FIG. 1A. Those coupons have the capability for storing information about the user to which they have been assigned. The process for the generation of coupons includes two main steps, described herein. The first step is the agreement with the client or producer/distributor of the goods or resources. The second step is the generation and distribution of coupons, each coupon having a unique code and a corresponding password for a particular end user or consumer.

The first step is to enter into an agreement with the client vendor, who is also the provider or resource-holder. The client may be a consumer goods company, who may have previously registered as a Client in the program. The client informs the program of their intention. to launch a mobile coupon campaign. The items that may be considered for the campaign and negotiated may include:

a. The product that will be promoted via the mobile coupon.

b. The number of coupons to be available: this is the number of coupons to be generated, it is important to note that the number of coupons generated may not equal the number of coupon codes delivered, since some coupons may be stored in one or more servers, waiting to be requested by the users on demand.

c. The Discount Value to be included in the mobile coupon: this is the amount to be discounted of the selected product once the coupon is redeemed. This amount will be exactly the same as the credit that the store will receive in e-money or top up depending on the availability of the store.

d. Target market: these are the particular segments or characteristics that compose a group that the client wishes to send the coupon via push. These characteristics are previously registered by the users in the platform, or can be gathered by the program during the campaign generation.

e. Coupon Validity: this validity is the time that the client authorizes the program to maintain the offer mentioned in the coupon. This validity is given as the final date that the user can redeem this coupon in an affiliated store. If the user tries to redeem a mobile coupon that is no longer valid, the application of the store where he or she is trying to redeem it will show "coupon no longer valid" or similar message.

f. Information to gather in the coupon campaign (insights). This is the information to be delivered in the ongoing campaign, and at the end of the campaign. This information should be negotiated and agreed before the start of the campaign. The information that can be given to the client includes:

i. Metrics: these relate to the effectiveness of the campaign, such as: coupons delivered, coupons redeemed, total amount of discount given.

ii Insights: this is additional added value information, such as the geographic regions with more effectiveness, socioeconomic segments of the population more prone to redemption, and the like.

The second portion of the program may then begin, once the terms and conditions of the coupon to be created are agreed. The program then proceeds to generate the different unique codes, each with its own corresponding password. These coupons are stored in the platform waiting the order to be delivered on demand. Alternatively, the coupons may be stored in a push SMS/application notification. It is also important to note that the platform can generate more coupon codes if necessary. In one embodiment, the program will generate exactly the specified number of coupons.

Each coupon may have the following information linked to it:

a. An amount to be credited: this is the value of the discount that the end user must receive when redeeming a coupon in a store and is also the value of the e-money transaction/top up that the store will receive once the coupon is redeemed.

b. SMS template text: the coupon has the informative text that will be presented to the end user once it is delivered, and to the store once the coupon is read.

c. Validity of the coupon: the coupon has implicit in it the date until it is valid to be redeemed in a store. This information may also be explicitly displayed with the coupon.

d. End user information: the coupon stores information of the user to which the coupon is assigned. This enables the coupon system or the resource provider/merchant to follow up on the coupon, and to improve their future marketing via these coupons. While all the coupon information may be encrypted, encryption of at least this portion is desirable. Once the process of coupon generation is completed, the coupons remain stored in the CouponServer until they are delivered in a push strategy, or on demand, depending on the wishes and specifications of the client.

Figure 5:
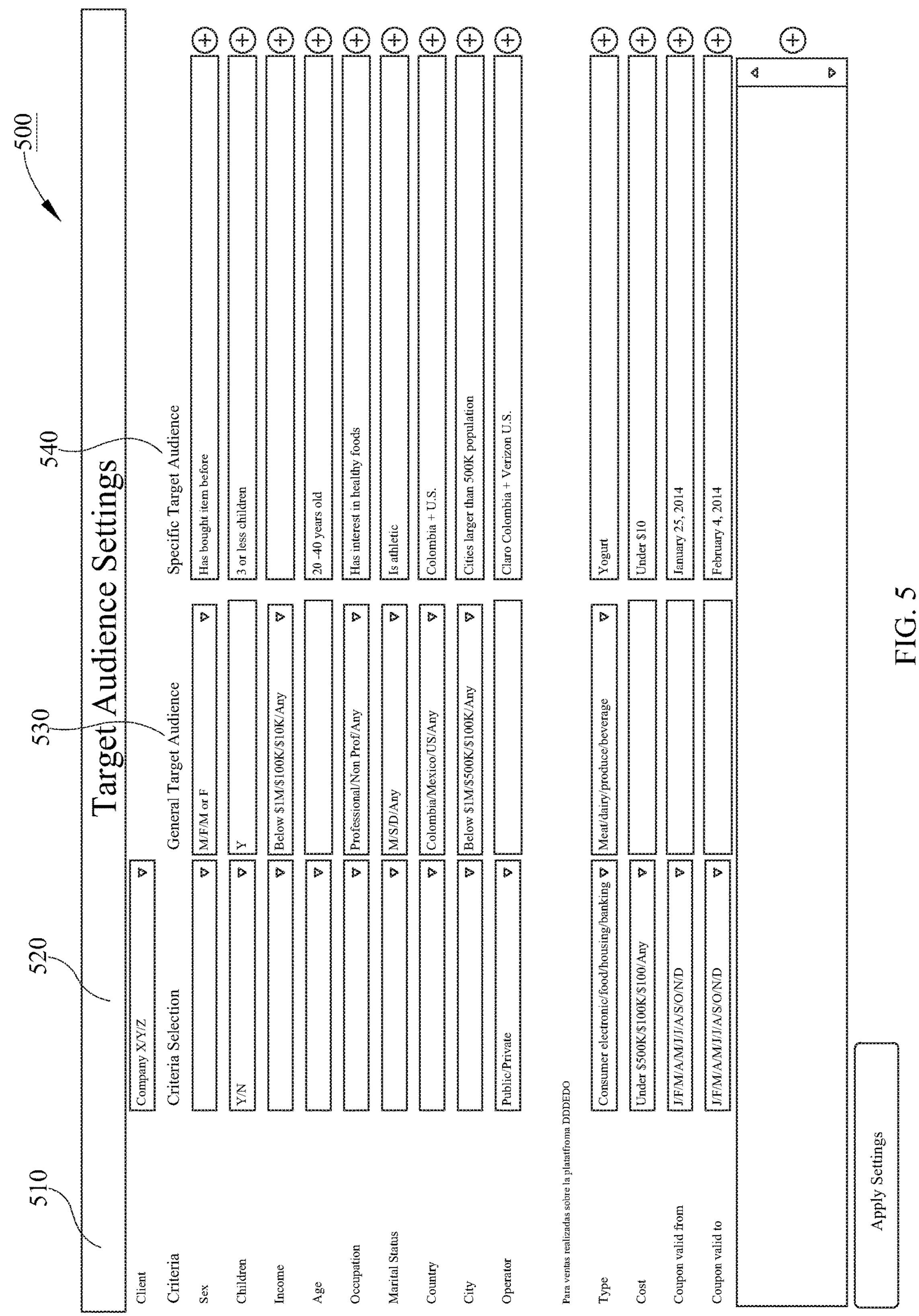
FIG. 5 depicts a dashboard depicting end user information that may be entered into the coupon system through a client on a computing device of a customer user of the coupon system of this disclosure.

Clients, such as merchants, providers and vendors, may wish to target their marketing campaigns to preferred customers. This may be accomplished with the present disclosure, selecting users or customers by applying selection or segmentation techniques to the users that are available in the network user registry. One technique may use a dashboard, as depicted in FIG. 5. Dashboard 500 is a screen shot of a dashboard that allows a vendor client to target users or consumers with desired characteristics, i.e., to select settings for a target audience. These characteristics may be among those discussed above in the discussion of User Registration in the Mobile Coupon Program. As shown in FIG. 5, the desired segment or target audience of end users may specify a plurality of criteria 510 with drop down menus 520, for instance, for selecting yes/no, public/private, male/female and the like. The criteria may involve demographics, such as user gender, income level, age, marital status, location (e.g., city, country), and the like. User characteristics may also include previous responses to coupon opportunities in this program. These characteristics may include prior sales of certain types of resources, the value of the sale (in currency), the vendor or resource provider ("from"), and the like. This and other segmentation techniques may help clients by tailoring their approaches to customers, selecting customer they wish, and targeting the customers they prefer.

A third column 530 may allow for selection of characteristics of the general target audience, such as more particular desired characteristics of the criteria 510. Examples may include a particular income level, target area or country, or other specifics, as desired. There may also be a column 540 or area for more particularly selecting the target audience, as shown, with personal characteristics. Examples include people who are already customers of a particular item or brand, number of children in the family, personal preferences, and so forth.

In one example, a client or company may be a dairy concern or a retail establishment that carries dairy products. The client may wish to market Greek yogurt and may wish to target women, aged 20-39 and with moderate to high income levels. The company can select these characteristics for the target audience, enter the timing for the campaign, and enter all other campaign parameters using the dashboard 500. The campaign parameters may also include a start date, a stop date, an area or region for stores or kiosks and a number of coupons that will be accepted, e.g., a maximum number of coupons allowed ("Only the first 50,000 coupons will be accepted. Hurry!"). In this instance, the authorization server will track the number of coupons redeemed and may decide that the maximum number has been reached, after which no additional redemptions will be allowed.

As shown in FIG. 5, the campaign parameters may be adjusted to account for users' or consumers' prior response to marketing campaigns. Thus, a user who has never responded may be excluded from one's campaigns. A user who has only responded with a small (cash value) purchase (value<$50) may be excluded, while a user who has responded at least once with a high value purchase (value>$500) may be sought. A client or provider may seek users who have purchased from certain providers or merchants, such as from the client itself or from competitors of the client.

Coupon Delivery to End Users

Once the coupons and codes are generated in the CouponServer, they are available to be sent via segmentation to different end users, the criteria to be decided by the client (provider or vendor) prior to the delivery. Once the program is operating, it will gather more information about the end users in order to provide better targeting or segmentation tools. Illustratively, this historical data may be stored in an archive server 120 depicted in FIG. 1A for use in designing future marketing campaigns. Once the segmentation is made, the coupons may have at least two delivery channels, which are complementary in order to cover a wider spectrum of mobile phones and other mobile devices.

The first is via text messages SMS (short message service). This channel delivers the information about the coupon in less than 160 characters. The information may include the product, type of discount, value, validity, unique code and password, and similar important information, in less than 160 characters. This channel is predominantly for feature phones, and some smartphones that do not have the application installed. The second method, via user applications, may also be used. End users that have the smartphone application installed will receive their coupons via this easy method. They will not only receive the information that the SMS users receive, such as product, type of discount, value, validity, unique code and password, but also they may also be provided with images, QR Codes or barcodes. These messages are provided without input or request by the user or consumer and are termed "push" type techniques, as the client or provider attempts to "push" the product or resource to consumers in the user network registry. In this embodiment, the end user will receive coupons that are targeted for people with characteristics similar to those of the user. The coupon depicted in FIG. 1B is an example of a coupon delivered through a smartphone application.

In addition to these "push" type techniques, this the program is able to deliver coupons on demand, i.e., a "pull" technique. Typically, such campaigns include advertising and promotional efforts to alert the consumer or user to a special offering or bargain for the product. Alerted by such notices, the user is able to browse the different available coupons, select the one(s) he or she is interested in, and request or "pull" the one or more selected coupons. The coupons may be delivered by the same channels as the mentioned before, SMS or Application, depending on the end user preferences.

As explained in connection with FIG. 1A, the user can browse and request the coupons via two channels, web pages 124 or smartphone applications. In one embodiment, the ability to browse coupons is limited to mobile devices; in another embodiment, users may browse coupons using full-size computers and viewing displays. In web pages, users can login in the web page of the mobile coupon program and browse the different coupons that are available at the moment, select them and request them. In smartphone applications, the end users that already have installed the smartphone application in their mobile phones can enter, browse and request coupons. The coupons requested will be sent to their application promptly, perhaps instantly. For both coupon request methods, the end users are registered in the program and the user logs into the platform to browse and request the coupons he or she wants. If the coupon requested is no longer available, the end user will be notified according to his or her contact preferences. Once the user receives the coupon via either technique (push or on demand), the user may then proceed to coupon redemption.

Coupon Redemption

Redemption of the mobile coupons takes place in one of the affiliated stores, such as the mom and pop stores. As mentioned above, each store may be affiliated as a part of the DDDEDO ("D for Discount") network with the J2ME (also known as Java ME, Java Micro Edition or Java 2 Platform, Micro Edition mobile application). Alternatively, each store may be affiliated outside the network via an unstructured supplementary service data (USSD) channel. USSD is a protocol used by GSM cellular phones to communicate with the service provider's computers.

The process for redemption may follow these four steps. The end user or customer approaches the affiliated store or kiosk in order to redeem his or her coupon, and tenders the coupon he or she wishes to redeem to the clerk or the point-of-sale (POS) terminal. The store clerk or POS terminal may than accept the coupon for redemption. The decision depends on the availability of the product for which the coupon is intended. For successful redemption, the client (such as a consumer goods company) should be prepared in terms of inventory and distribution of the products that are part of the coupon campaign. If the store has no product, the coupon cannot be redeemed. After product availability is assured, the end user or customer shows or enters the unique coupon code and corresponding password for the coupon. The customer user may also be required to provide identification for additional verification that the presenter is the user to whom the coupon was issued to by the system.

Once all the information corresponding to the coupon, the code and the password has been provided, there are two options, depending on the type of affiliation of the store, to redeem the coupon. If the store is part of the "D for Discount" network, the store may be equipped with the Java ME application for reading and redeeming coupons. If so, the store then accesses the application and submits the required information for the coupon, i.e., the unique code and password. Once the information is submitted, it will be received by the program CouponServer, which checks the information provided by the store about the determined coupon, and returns one of the following answers, the coupon is valid, the coupon is invalid, or the coupon information is incorrect and cannot be determined.

The CouponServer may determine that the coupon is valid, that the unique code and the passwords are correct, and that the coupon is still valid and has not been redeemed. The CouponServer will then respond positively allowing the store to redeem the coupon or to cancel the redemption process. If the redemption process continues, the Java ME application will send the request to the CouponServer, which will generate the order to notify the end user about the redemption made, mark the coupon as redeemed and finally credit via e-money to the store. This e-money is useful to the "D for Discount" network, allowing the affiliated stores to perform transactions such as top ups, banking correspondence, and payment of selected suppliers. Once the credit is accomplished, the "D for Discount" platform will confirm it via SMS to the store owner. When the process is complete, the clerk will deliver the product for which the coupon is valid to the end user with the appropriate discount of the coupon. In one example, the e-money is a credit that a franchisor may provide to the kiosk owner on redemption of the coupon at the kiosk. In another example, the e-money may be a credit provided by a product supplier. For example, in the illustrative example depicted in FIG. 1B, the e-money may be provided by the maker of Bon Yurt Alpina. As another example, the e-money may be provided by a city or locality or an organization like the members of an environmental group. For example, the city may issue e-money on certain products for people on welfare. A locality may issue e-money on certain products that are produced by a company in the locality. A group such as an environmental group may issue e-money on certain products that are organic or environmentally friendly.

If the CouponServer determines that the coupon is not valid, there are several possibilities. In one example, both the unique code and password of the coupon may be correct but the coupon may no longer be valid, perhaps because it is before or after the scheduled dates of redemption, or the coupon may already have been redeemed. In this case, the CouponServer platform will return a notification to the store which will state that the coupon is not valid. The CouponServer platform also will notify the end user linked to the coupon via SMS, telling him or her that the coupon he or she tried to redeem is not valid.

In a third example, the unique code or password may be incorrect. The CouponServer will notify the store in their application that the coupon does not exist. Since there is no valid coupon, there is no end user to be linked and the end user will not be notified since the end user may not be identified. There is also a possibility that the J2ME application has a connection error due to connectivity problems in the Mobile Network Operator platform, in which case the application will notify the store about the inconvenience, and the store clerk will again submit the information of the coupon. Alternatively, if a POS terminal is used, the user may again submit the information through the terminal.

Figure 6:
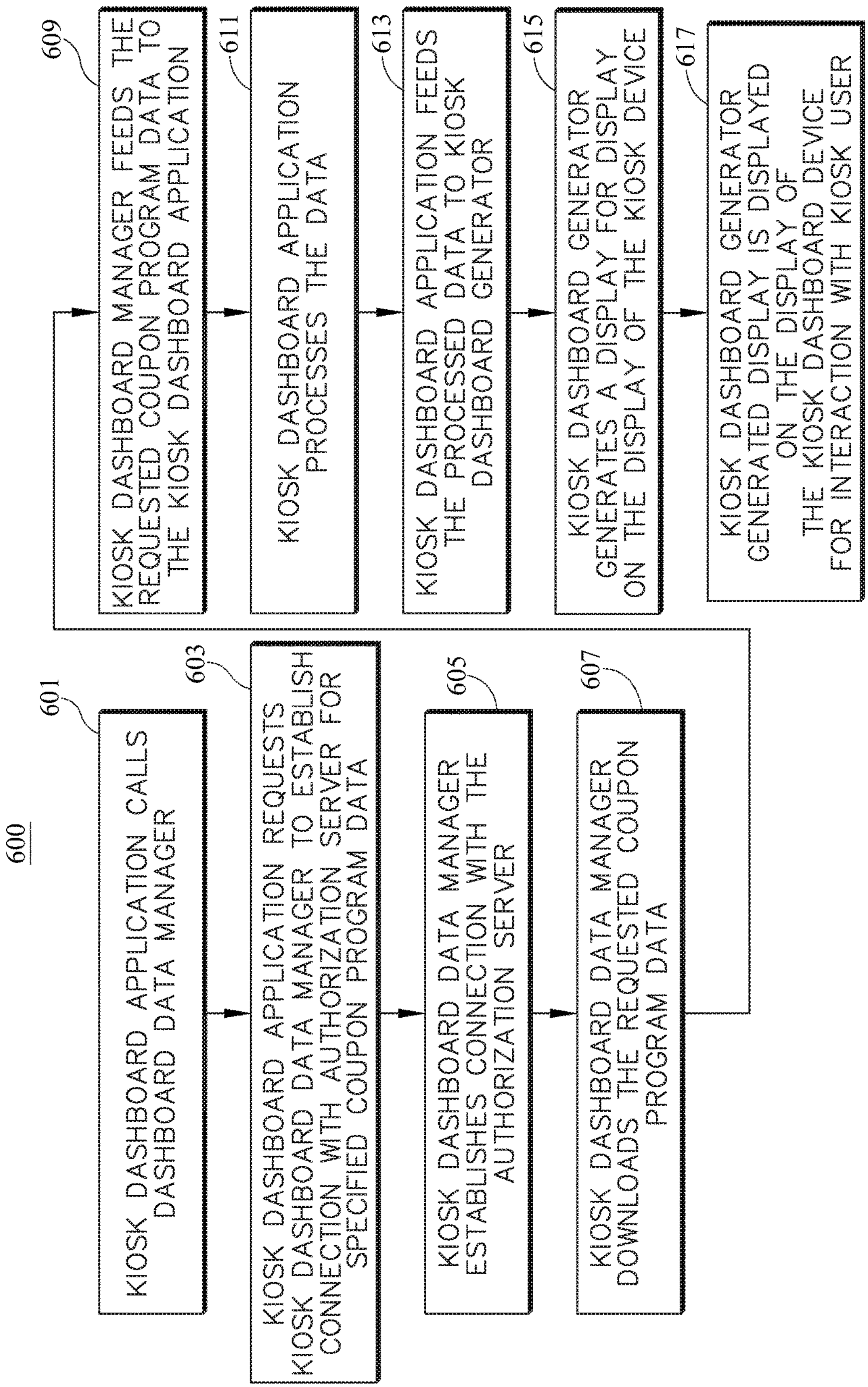
FIG. 6 is a flowchart depicting flow of the registration and validation process of the coupon system of this disclosure.
Figure 7A:
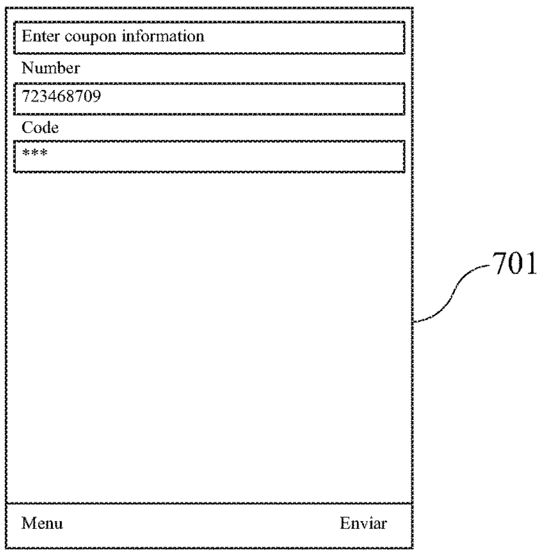
FIGS. 7A-7D depict screen shots of wireless device validating a coupon and unique password at a kiosk participating in the coupon system of this disclosure.
Figure 7B:
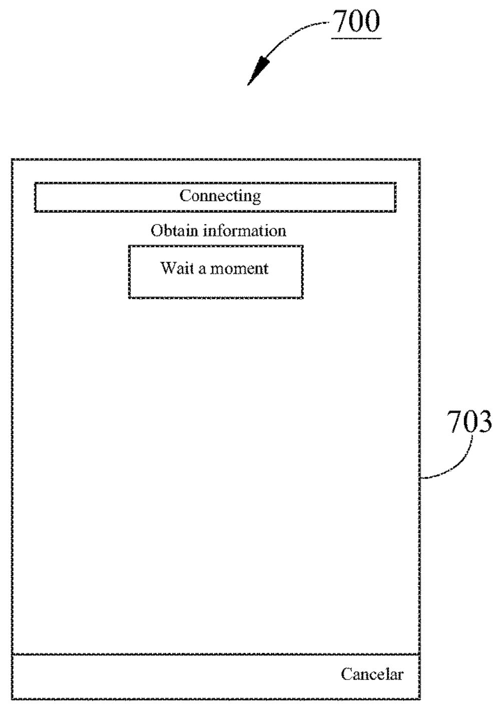
Figure 7C:
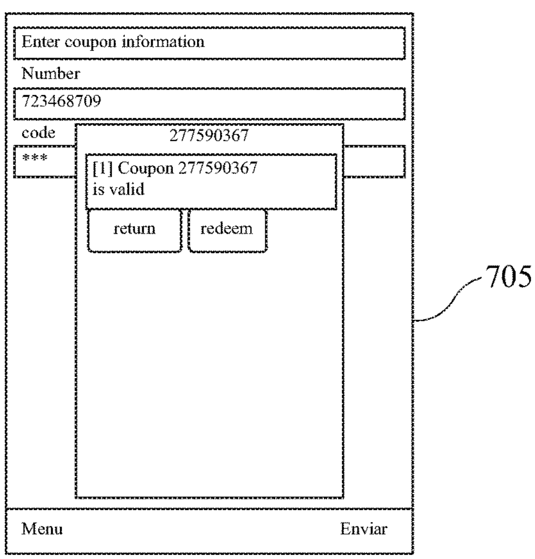
Figure 7D:
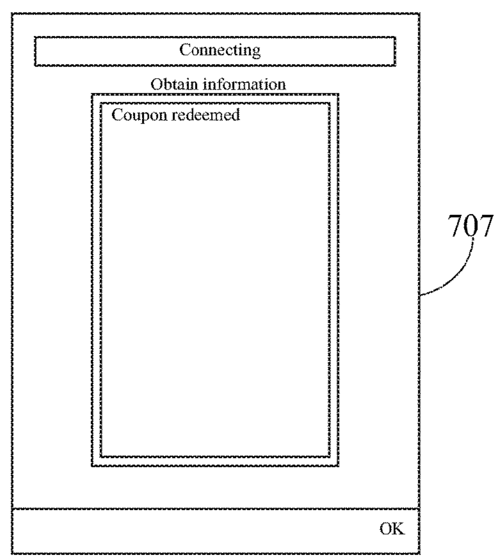

This process is disclosed and illustrated by the flowchart of FIG. 6, showing the process 600 for coupon redemption. In one embodiment, the kiosk dashboard application of the kiosk mobile device calls 601 the dashboard data manager. The kiosk dashboard application requests 603 the kiosk dashboard data manager to establish a connection with the program Authorization Server for data of a specified coupon program. The kiosk dashboard data manager then establishes 605 the connection of the Authorization Server with the kiosk dashboard application. At that point, the kiosk dashboard data manager downloads 607 the program data for the requested coupon program.

Using this connection, the kiosk dashboard manager then feeds 609 the data of the requested coupon program to the kiosk dashboard application. The kiosk dashboard application then processes 611 the data and feeds 613 the processed data to the kiosk dashboard generator. The kiosk dashboard generator then generates 615 a display for output on the kiosk mobile device. The kiosk user may then interact 617 with the display of the kiosk dashboard device.

In another example, FIGS. 7A-D depict screenshots 700 for various steps of executing the process using the kiosk mobile application device. In view 701, the customer or clerk enters information into the mobile kiosk or store device. In this view, the screen instructs the user or clerk to enter the coupon information, including the coupon number and the password or key. After this information is entered, the kiosk dashboard application in screen shot 703 attempts to connect with the Authorization Server, the screen displaying " . . . connecting . . . ," "obtaining information," and "wait a moment." If the information is correct, the coupon is still valid, and the resource registry confirms that sufficient product or resource is available and all circumstances permit ready delivery of the resource, screen 705 may appear. In this screen, the user has already entered the coupon information, the coupon number and the password or key. The Authorization Server response to the kiosk dashboard application is that the coupon is valid. The user or clerk is then presented, in this embodiment, with two options, to redeem the coupon or to return later. In this instance, the user or clerk chooses to redeem the coupon and the final screen shot 707 again states, " . . . connecting . . . ," "obtaining information," and "coupon redeemed," thus ending the process. These particular formats and messages are not necessary for the proper functioning of the process.

As discussed above, the store may not be affiliated with the network and may not have a mobile phone or terminal provided by the "D for Discount" network. Alternatively, the store may not have the application installed in its "D for Discount" phone. In this example, the store can read and redeem coupons via USSD with no additional costs. The USSD platform works just as the J2ME application, where the store enters the information of the coupon (unique code and password), and the answers are the same as the J2ME application. The only difference is that some USSD stores are not part of the network. In this example, when the out-of-network store asks to redeem a coupon, the CouponServer will confirm whether the value of the coupon is compatible with a Top Up, e.g., fixed amounts set by the mobile network operator. If the amount is not compatible, the CouponServer will notify the store via USSD and the end user via SMS. If the Top Up is allowable, the CouponServer will request the top up to the platform which will request the transaction to the mobile network operator and will Top Up the mobile line that requested the redemption of the coupon (which belongs to the store). In case that the USSD requester belongs to the network the credit will be performed via e-money credit, described before in the J2ME application.

Program Overview

An overview of the system architecture is presented in FIGS. 8A-1, 8A-2, 8A-3, 8A-4, 8B-1, 8B-2, 8B-3, 8B-4, 8C1, 8C-2, 8C-3 and 8C-4. The coupon redemption architecture 800 includes all aspects of the program executed by the system of this disclosure, from generation and delivery of the coupons to redemption of the coupons, as shown in FIGS. 8A-1, 8A-2, 8A-3, 8A-4, 8B-1, 8B-2, 8B-3, 8B-4, 8C1, 8C-2, 8C-3 and 8C-4. The program may be considered to have five levels, as shown, beginning with the e-money platform 801, in communication with store owners 802 and the coupon platform itself 803. The coupon platform 803 communicates with the end users 805 through the mobile network operator (MNO) level 804. The overview starts 811 with the coupon platform with rules or determinants 813 for coupon generation, followed by generation 815 of estimated coupon codes and delivery 817 to the end user, per the end user's order. At that point, the platform needs to determine 819 whether the particular program is a "push" program for an unsolicited campaign or a "pull" program for on-demand coupons, as described above.

If the campaign is for a "pull" program, the next step is for a user, such as an end user 805, to log into 821 the coupon platform. The user then checks 823 for available coupons, and if he or she wishes, selects 825 one or more coupons and sends 827 a coupon request. The coupon platform receives 831 the coupon request and checks 833 whether there are coupons available. If no coupons are available 835, the user receives 837 notification that no coupons are available and is queried as to whether he or she wishes to browse 829 more coupons. If not, the user may then end 830 participation in the program, for the moment. If the user from step 837 wishes to check for more available coupons 829, the user may then check 823 for more coupons, and if he or she selects 825 a desired coupon, may follow 827 the path previously described, returning 831 to step, where the coupon platform then receives the user's request.

Returning to step 819, if the campaign is for a "push" program, the end user or customer may be assigned a code 841 and then receives coupon delivery 845 according to a distribution program. A user of the pull program in step 833 with available coupons will then proceed to be assigned a user code 843 and will also receive 845 coupon delivery per the distribution program. After this step, the coupon platform decides 847 whether distribution of the coupon is to be made via SMS or via an application, e.g., SMS 848 or a mobile telephone app 849. If SMS, the mobile network operator receives 851 the SMS delivery order, generates 853 the necessary messages or communications and arranges for SMS delivery 855. The end user then receives 857 a short message service (SMS) message with coupon information. People who wish delivery via an app 849 also receive notification 861 of the new coupon. Users 857 and 861 must then decide whether they wish to redeem the coupon 863. If not, their participation ends 830, at least for the moment. If they wish to redeem the coupon, they may go to an affiliated store 865 and request to redeem 867 the coupon. At the store, they inquire whether a desired product is available 869. If not, their participation may end soon 830. If they do not wish to redeem the coupon, their participation may also end 830, for the moment. If they wish to redeem the coupon 871, they may go to step 901, in FIG. 8B-3.

Figures 1, 8A:
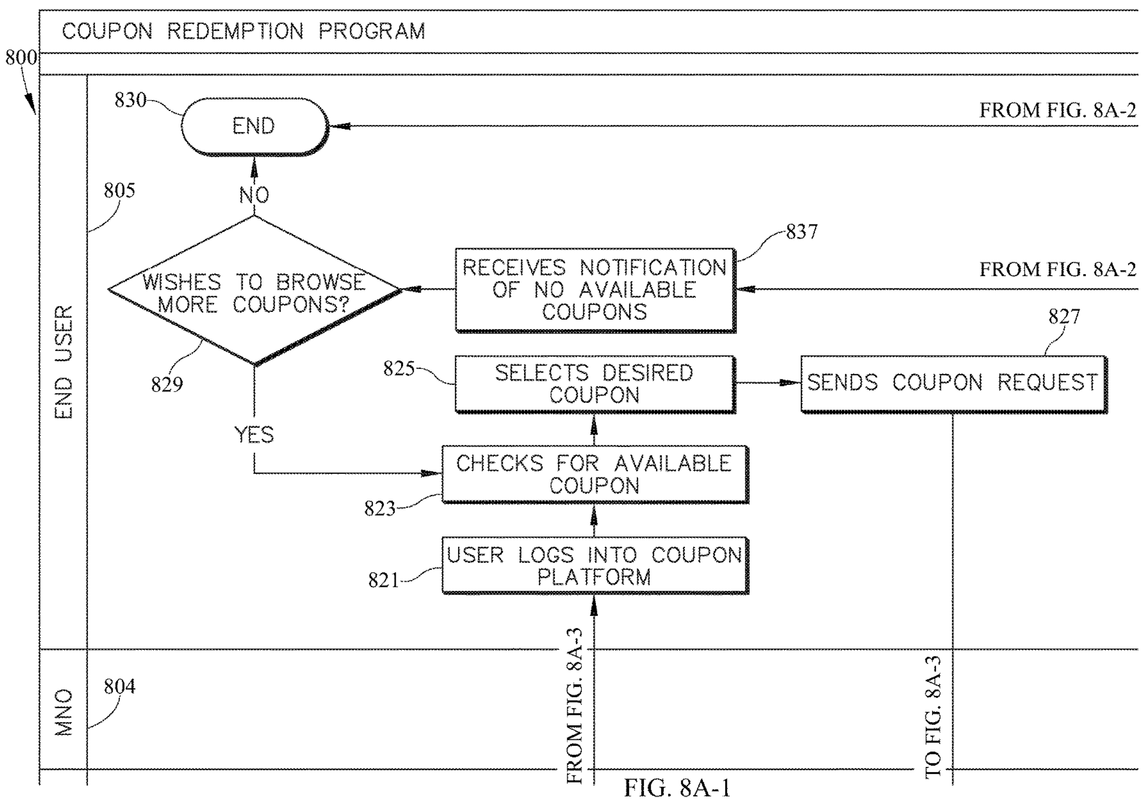
Figures 2, 8A:
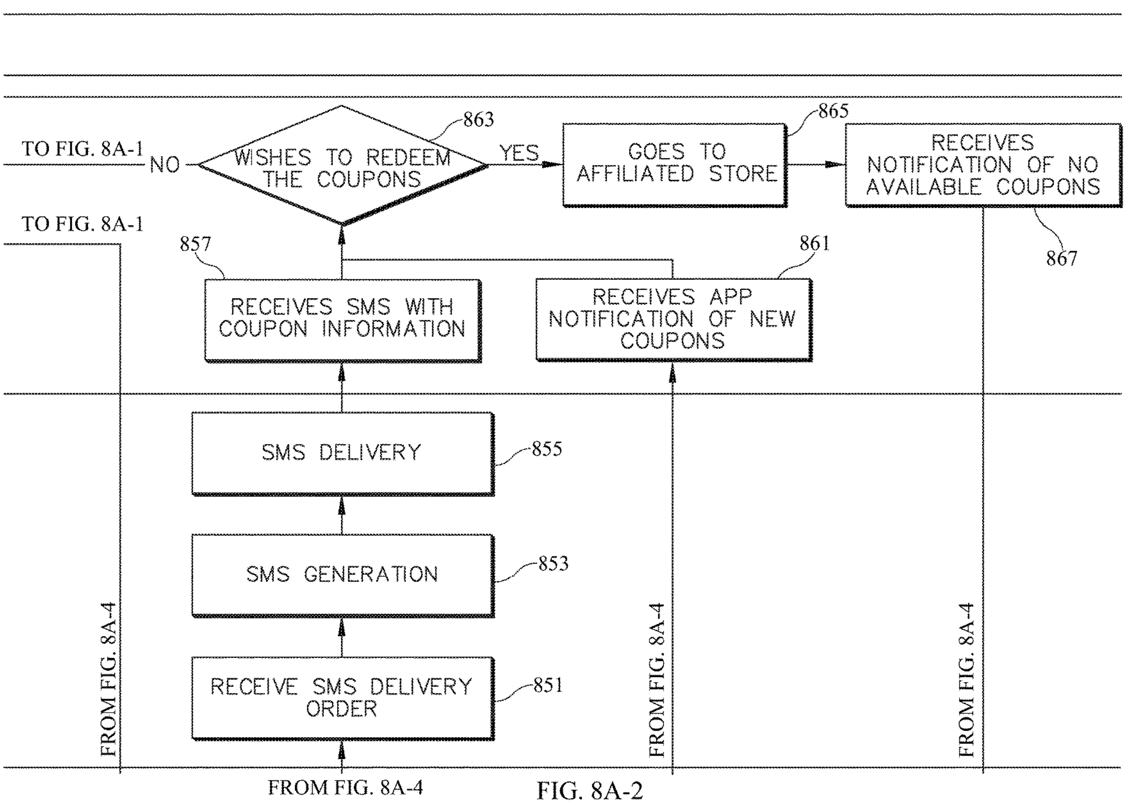
Figures 3, 8A:
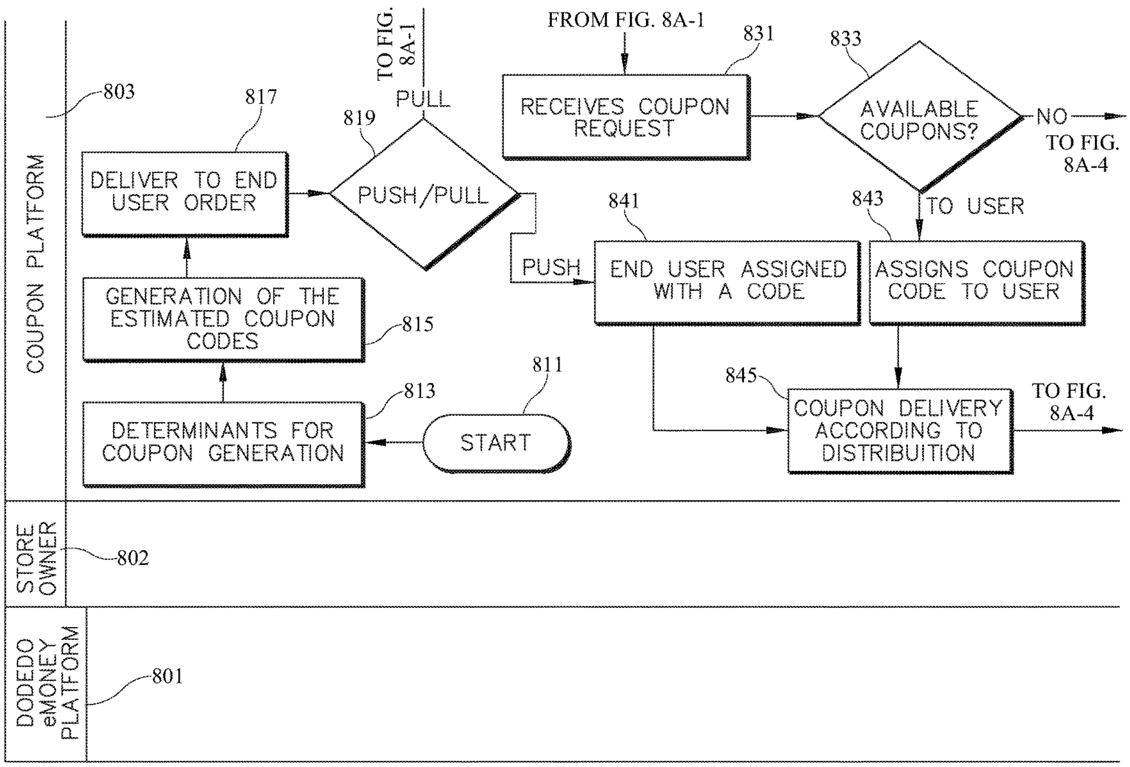
Figures 4, 8A:
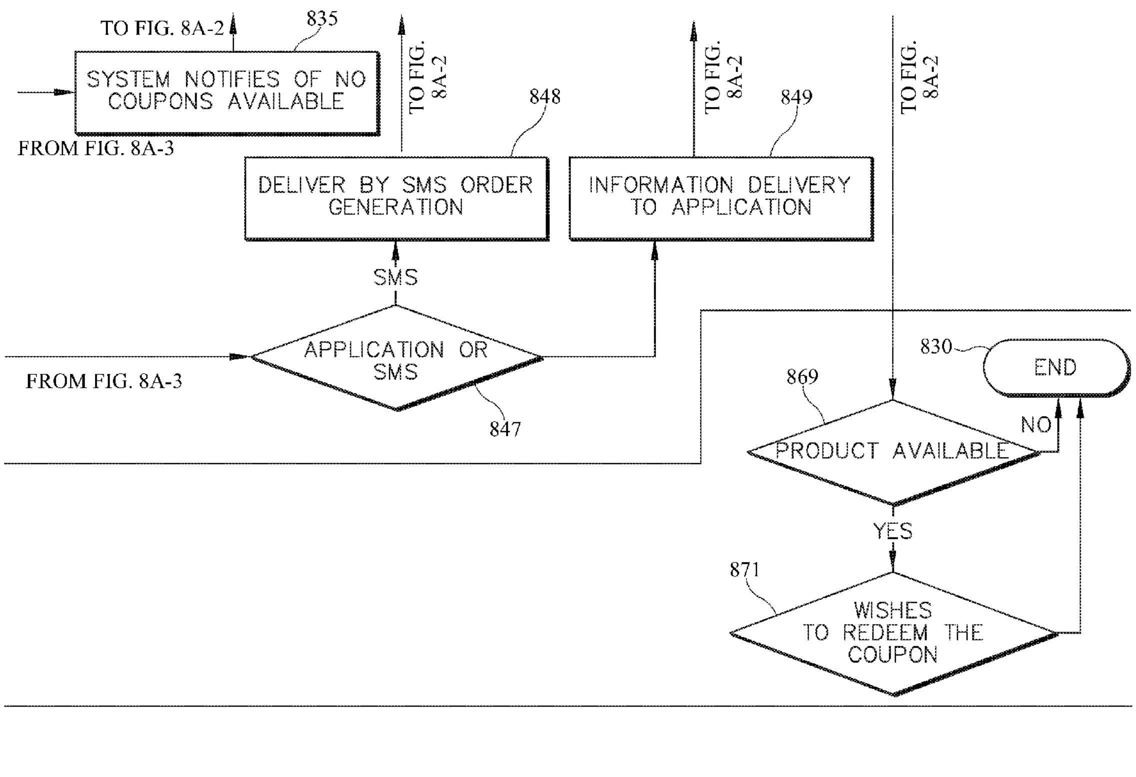
Figures 1, 8B:
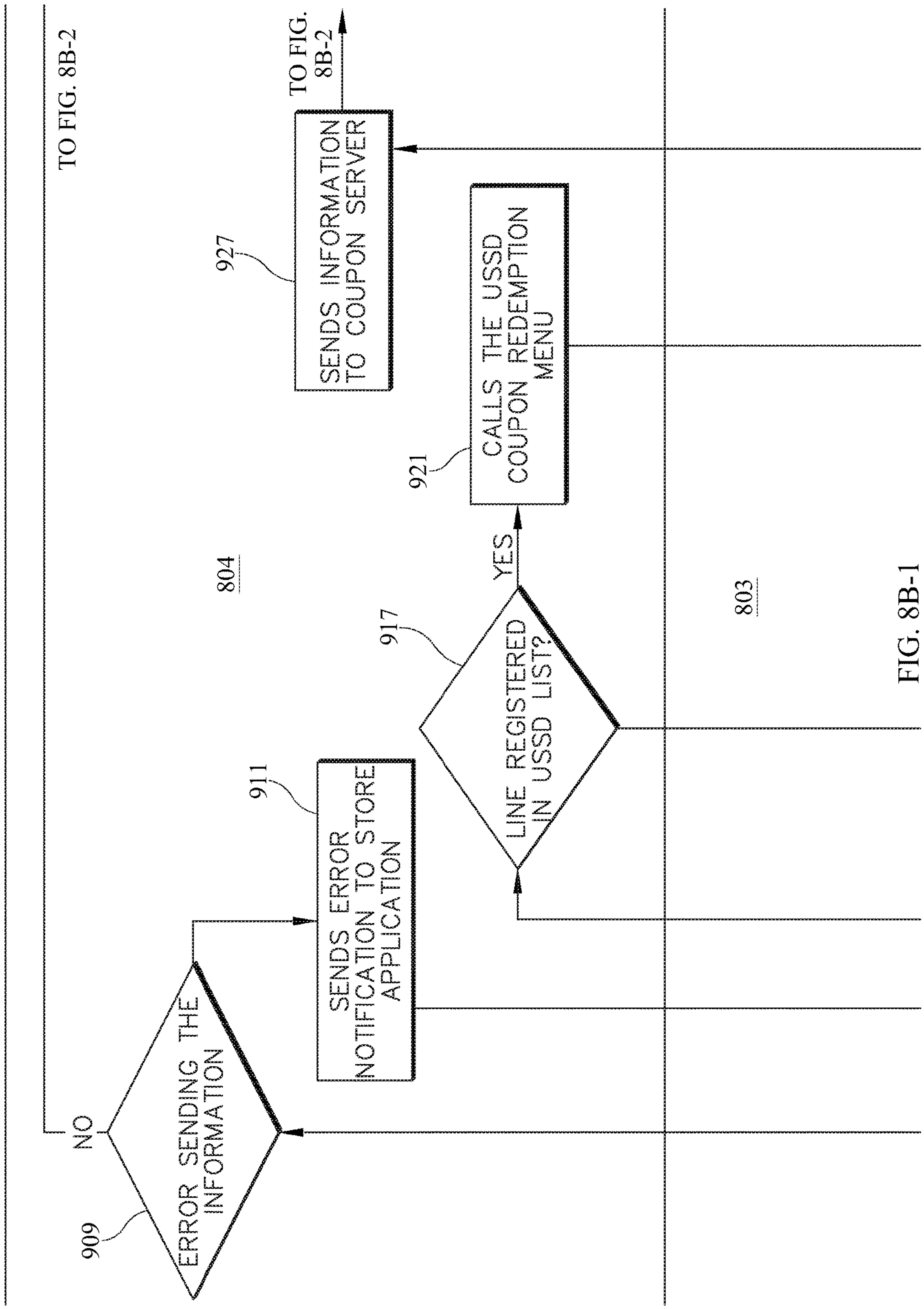
Figures 2, 8B:
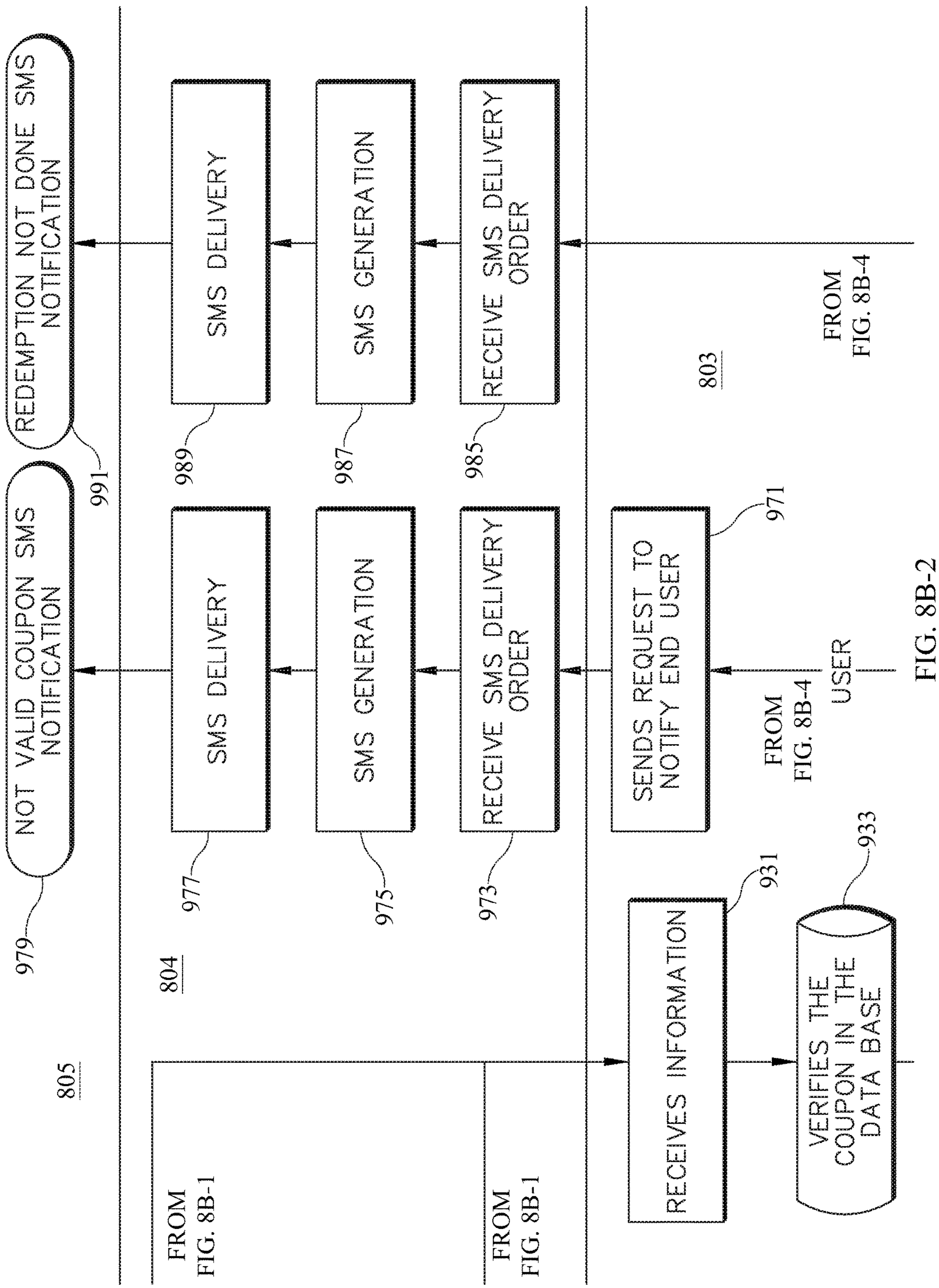
Figures 3, 8B:
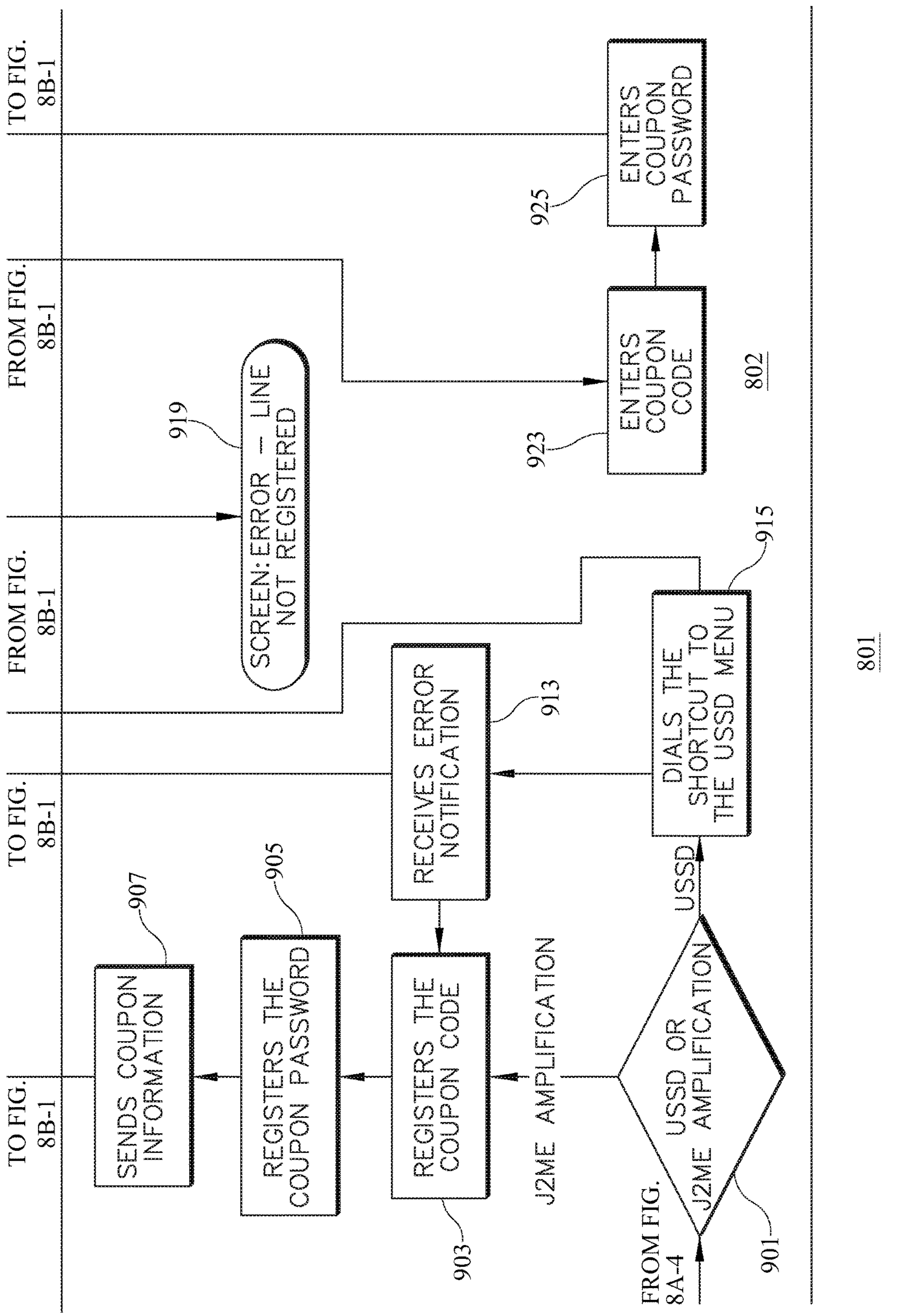
Figures 4, 8B:
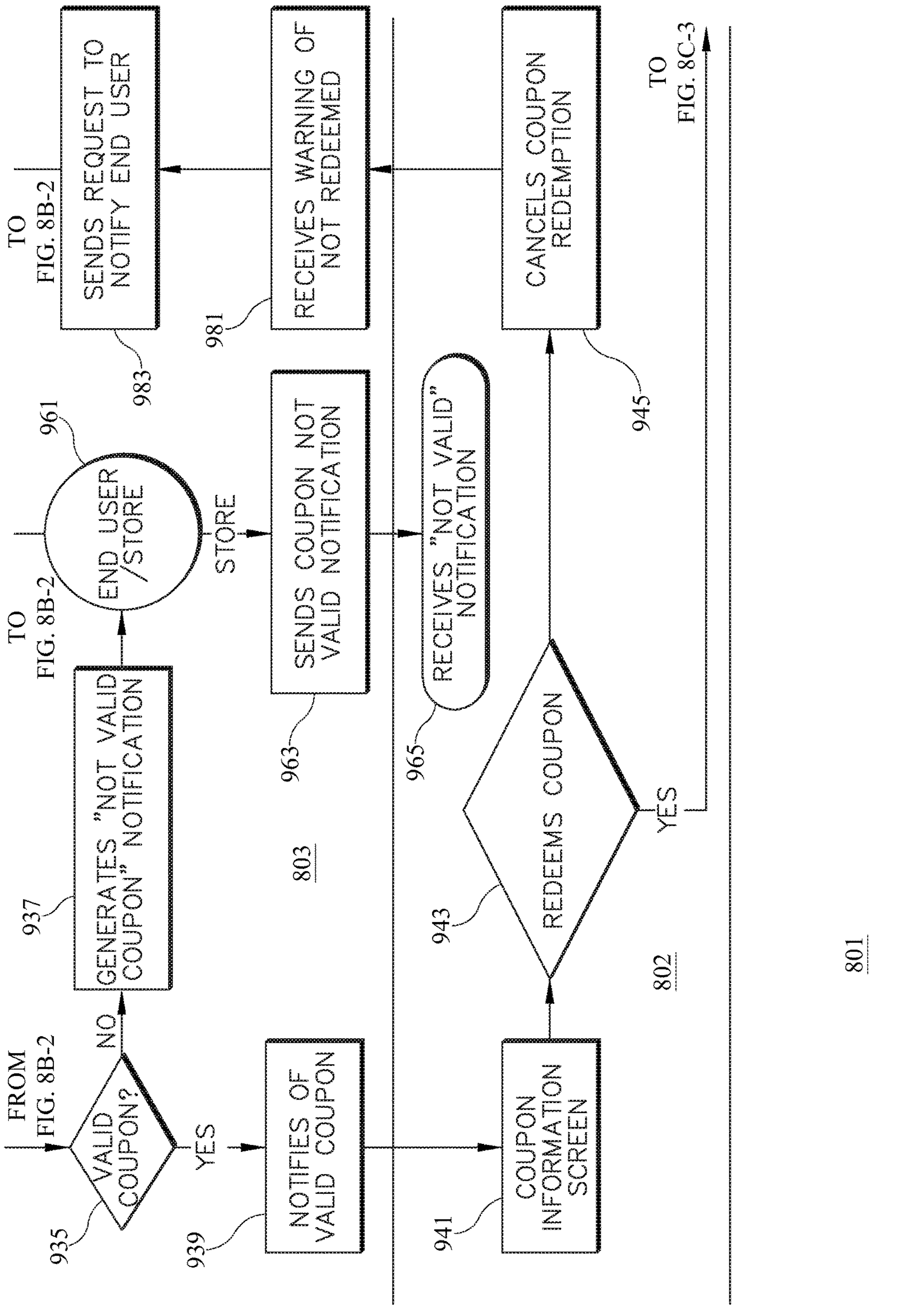

Beginning with step 901 in FIG. 8B-3, the D for Discount platform decides whether the user is considering an out-of network store USSD or an in-network store J2ME. If J2ME, i.e., an in-network store, the user is routed to register the coupon code 903, register the coupon password 905 and send the coupon information 907 to the mobile network operator to determine whether there is any error 909. If there is an error, an error message is sent 911 and the store owner receives an error notification 913. The store owner again tries 903, 905 to register the coupon code and password. If there is no error in step 909, the user is routed to terminal 931 to receive information about the coupon. Returning to step 901, if the user is considering an out-of network store USSD, the system dials the shortcut 915 to the USSD menu. The user is then routed to step 917, to determine whether the user's telephone or line is registered in the list of USSD apps. If not, a screen error will appear 919. If the line is properly registered, the user is routed to step 921 to call up the USSD coupon redemption menu. The store owner or clerk then enters the code 923 and password 925, sending information to the coupon server 927.

The coupon platform then receives 931 information for users from both step 909 and 927 and verifies 933 the coupon or coupons in the data base. If the coupons are valid 935, the D for Discount platform then notifies 939 the users that the coupon is valid and proceeds 941 to the coupon platform's coupon information screen. If the process then is valid and can proceed to redeem 943 the coupon, the platform proceeds to step 1001 in FIG. 8C-3 and selects redeem. If the process is not valid and the coupon will not be redeemed, the store owner or clerk cancels 945 the redemption and the coupon platform receives 981 a warning that the coupon was not redeemed. The platform also sends 983 a request to notify the mobile network operator that the coupon was not redeemed. The mobile network operator then receives 985 the message via SMS, generates 987 an SMS message and sends 989 the message to notify 991 the end user that the coupon was not redeemed.

Returning to box 935, if the coupon is not valid, the coupon platform then generates 937 a notification that the coupon is not valid to send 961 to the end user and to the store owner. The coupon platform then sends 963 a notification to the store owner, who receives 965 a "not valid" notification. The coupon platform also sends 971 a notification to the mobile network operator for sending to the end user. The mobile network operator then receives the SMS message 973, generates 975 a message for sending, and sends 977 it to the user. The customer or user receives 979 a "coupon not valid" SMS notification. Returning to step 943, if the coupon redemption is cancelled, the store owner then cancels 945 the coupon redemption and the coupon platform then receives a warning 981 that the coupon was not redeemed. The coupon platform the sends a request 983 to the mobile network operator to notify the customer. The mobile network operator then receives 985 the SMS message, generates 987 an SMS message and sends 989 it to the customer, who receives 991 it. This completes the description of FIGS. 8B-1, 8B-2, 8B-3 and 8B-4.

Figures 1, 8C:
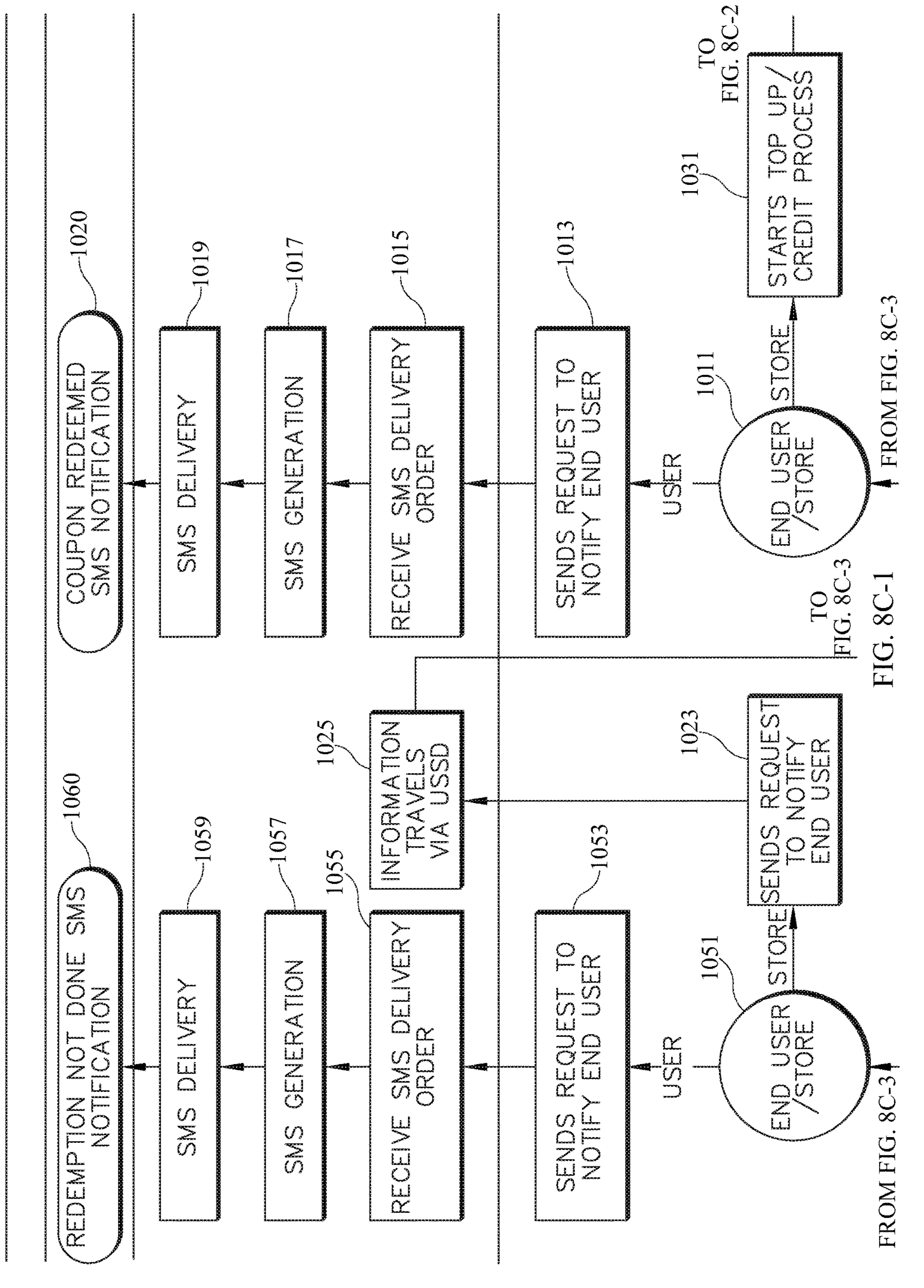
Figures 2, 8C:
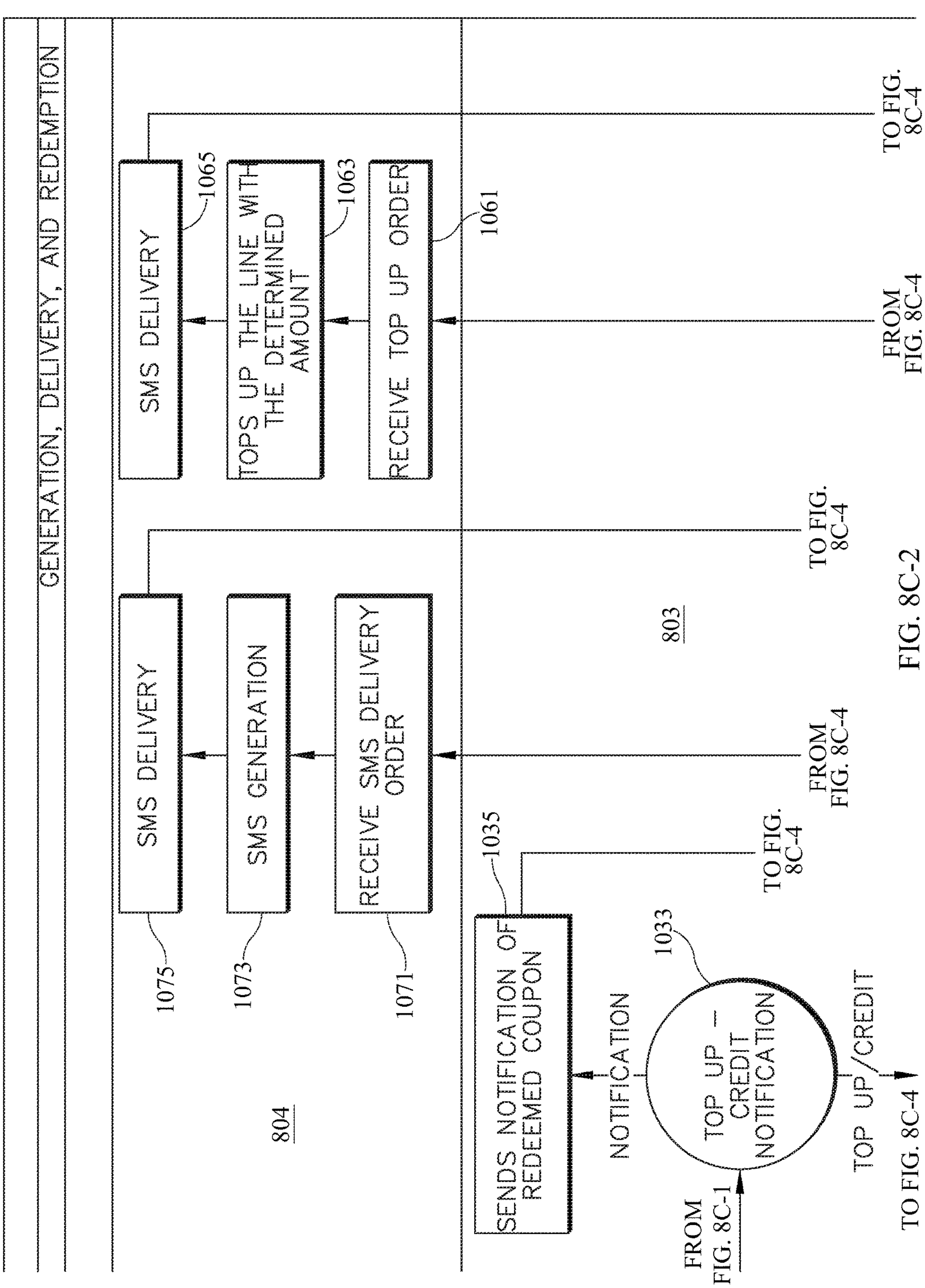
Figures 3, 8C:
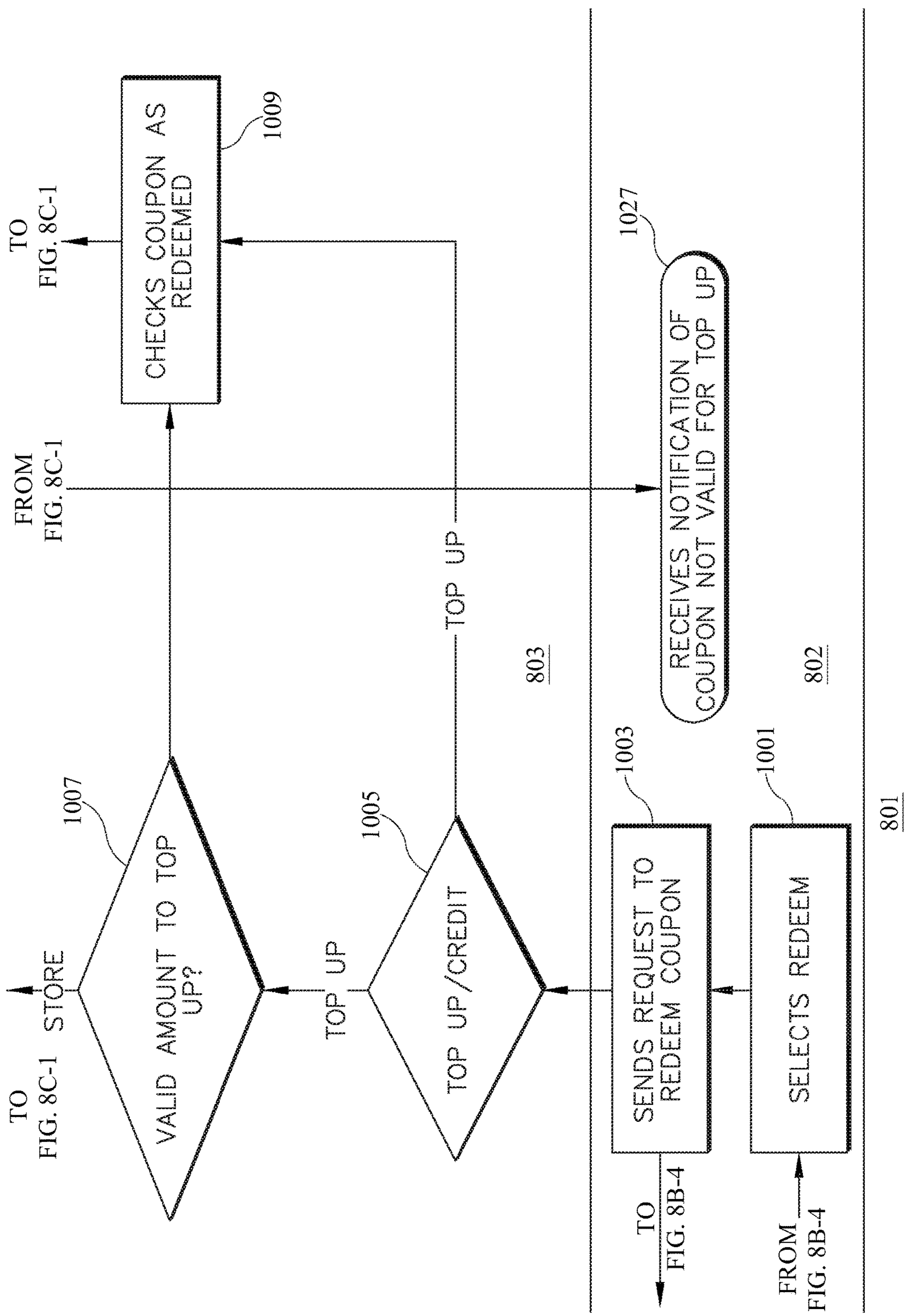
Figures 4, 8C:
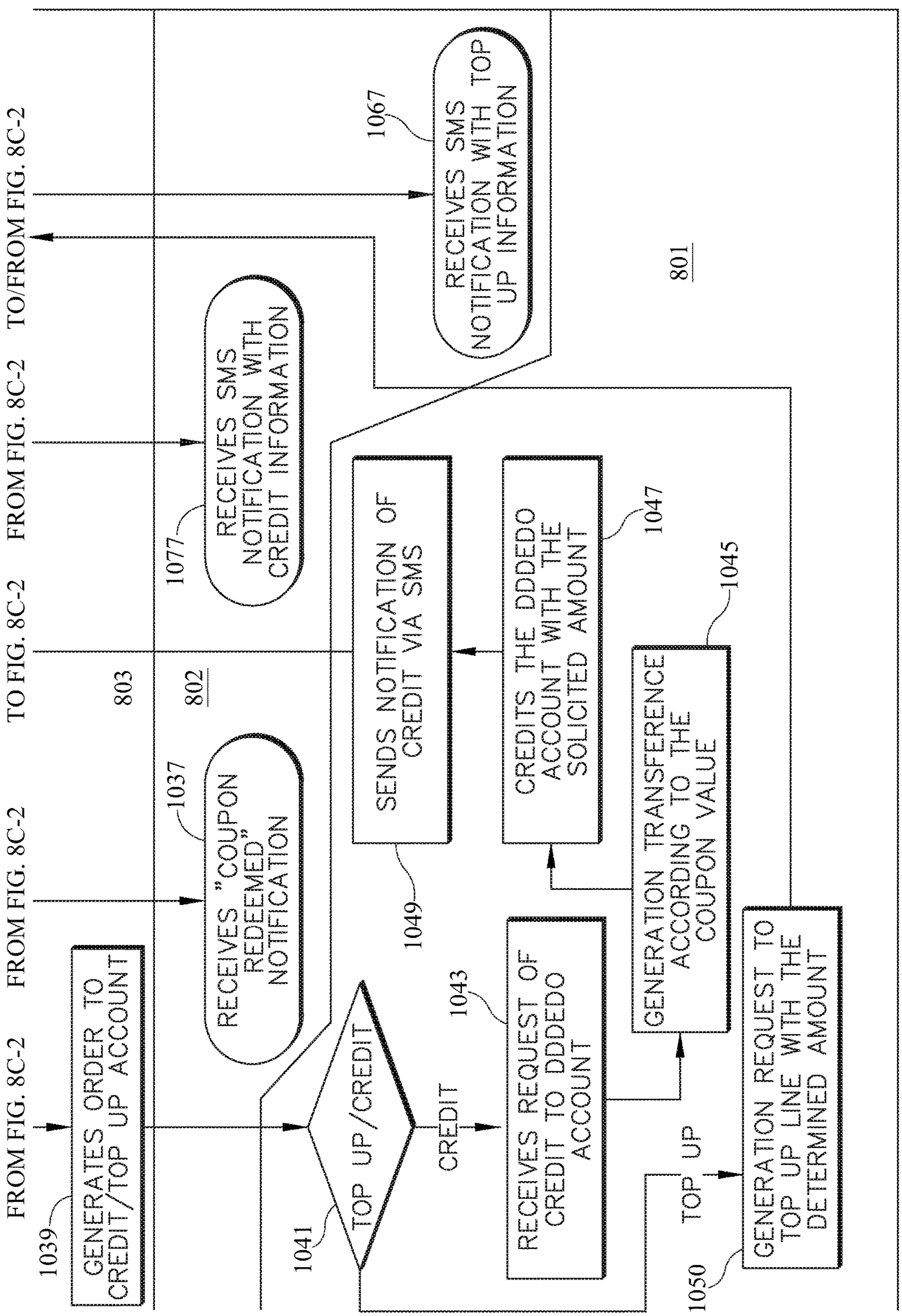

FIG. 8C-3 then picks up at step 1001, where the store owner is about to redeem the coupon. The store owner selects 1001 redeem and sends 1003 a request to the coupon platform. The coupon platform then checks 1005 credit. If credit is OK, the coupon platform checks 1009 the coupon as redeemed; or if credit is not OK, but a top-up or increase in credit is available 1007, the coupon platform will also check the coupon 1009 as redeemed. If top up is not available, the coupon platform notifies the store 1051 and also sends a request 1023 to notify the user/customer. The request travels 1025 to the out-of-network store and the store owner receives 1027 a notification that the coupon is not valid for top up. Returning to step 1051, the coupon platform has notified the store and sends a request 1053 to notify the customer. The mobile network operator then receives 1055 the request for SMS message delivery, generates an SMS message 1057 and delivers the SMS message 1059, to the customer 1060, who receives the message. Returning to step 1009, the coupon has been checked as redeemed. The coupon platform then notifies 1011 the store and sends a request via SMS 1013 to notify the end user. The mobile network operator then receives 1015 the request for SMS message delivery, generates 1017 an SMS message and delivers 1019 the SMS message to the customer, who receives 1020 it.

Returning to step 1011, for the situation in which top-up is needed, the coupon platform 1031 begins the top-up process, beginning with notification 1033. The coupon platform sends 1035 a notification to the store owner, who receives 1037 the notification. The coupon platform also generates 1039 an order to increase the credit or top up the user's account. This request is received 1041 by the D for Discount platform, which then decides whether to generate a request to top up the available credit 1050 with a determined amount, or to allow credit 1043. If the decision is to allow credit, the program treats the decision 1041 as a request 1043 to allow credit, and then generates a transfer 1045 according to the value of the coupon. It then credits 1047 the D for Discount account of the user or customer with the requested amount and sends 1049 a notification of the credit via SMS. At the mobile network operator level, the notification is received 1071, a reply SMS is generated 1073 and then sent 1075 to the store owner, who receives 1077 the notification of the credit. Returning to step 1050, if the decision is to request top up, the D for Discount program generates a request to top up or increase the user's credit by a determined amount, the mobile network operator then receives 1061 the request via SMS, generates 1063 a reply via SMS and sends 1065 the reply via SMS to the store owner, who receives 1067 the request with the top up information.

Simplified Overview

Figure 9A:
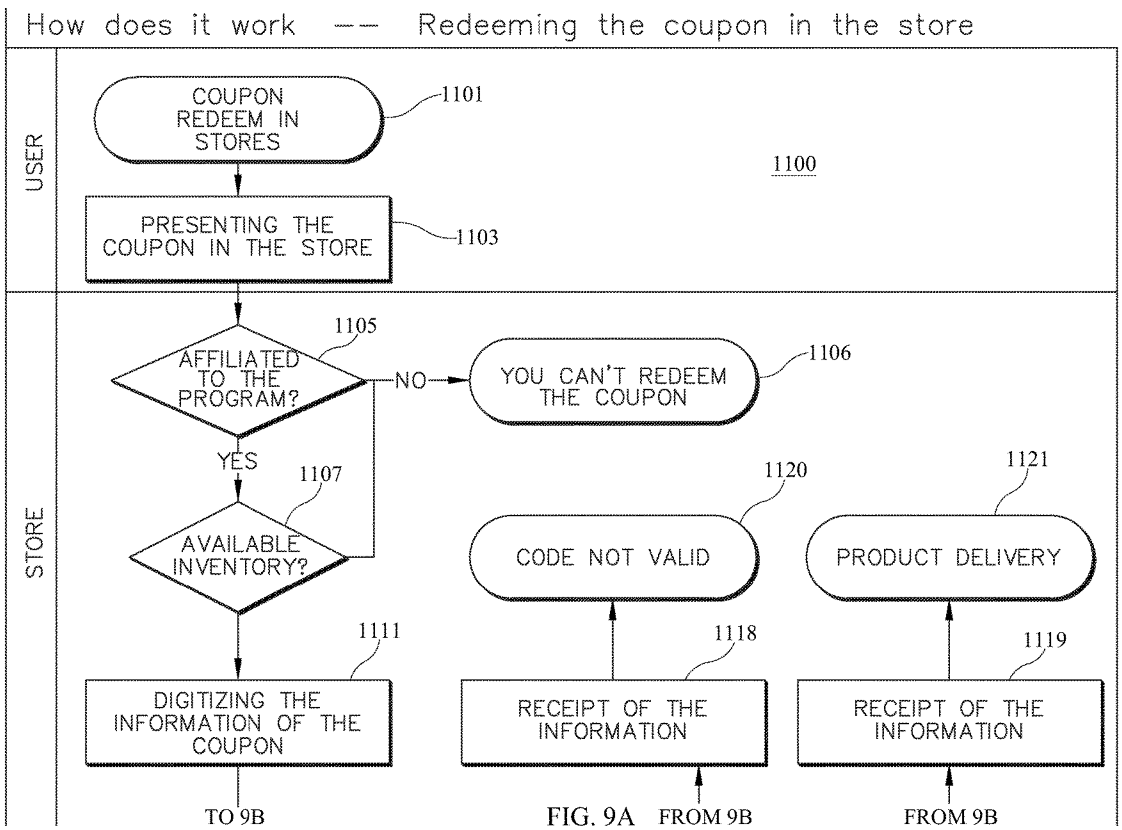
FIG. 9 is a flow chart providing a simplified view of the process flow in a coupon program system of this disclosure.
Figure 9B:
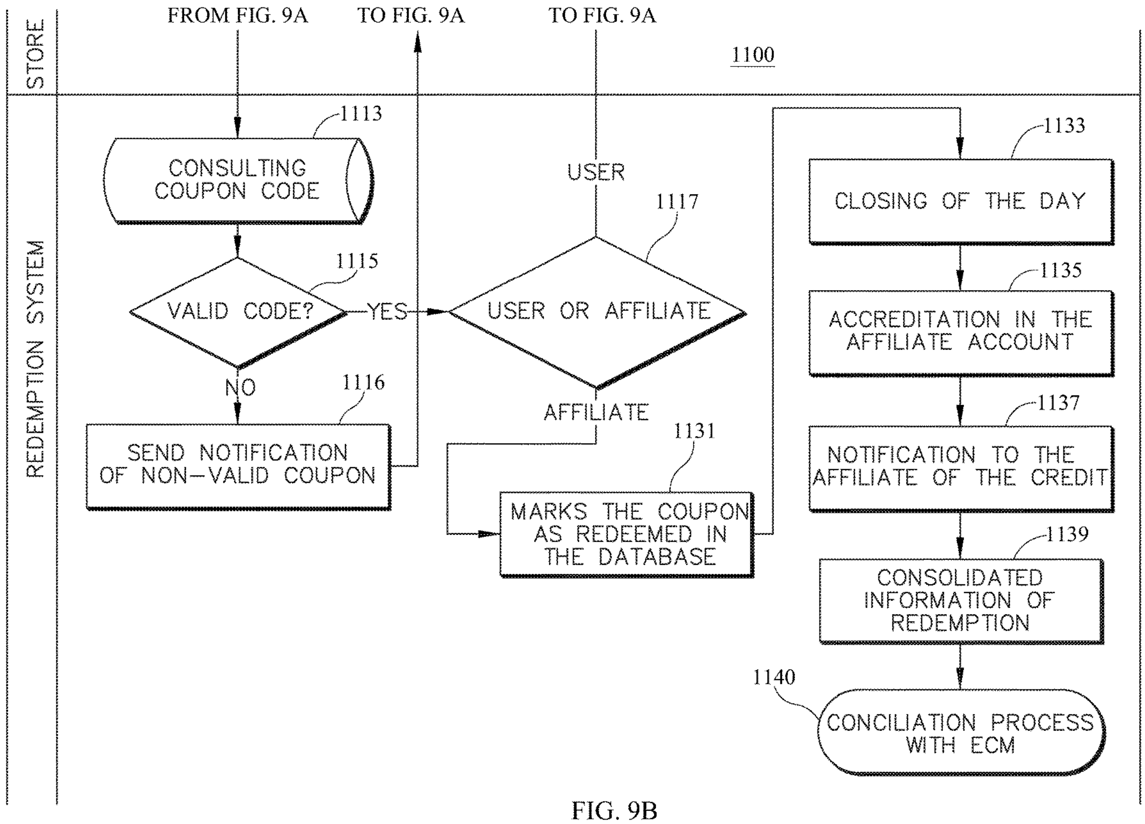

FIG. 9 provides a simplified overview of the workings of the coupon redemption process 1100, with contributions of the user, the store and the coupon program. In a first step, a user wishes to redeem 1101 a coupon in a store and the user presents 1103 the coupon to the store for redemption. The first check conducted by the store is to check 1105 whether the store is affiliated with the coupon program. If the store has not joined the coupon program, the store is not eligible to participate 1106 and the coupon cannot be redeemed. If the store has joined the program and the store is affiliated with the program, the next check 1107 is to see if product is available. If the store has no product, the coupon cannot be redeemed 1106. If product is available the store looks 111 for digital information about the coupon. The store consults or views the coupon code 1113 at the coupon platform and determines whether the coupon code presented 1115 is valid. If the coupon code is not valid, the coupon platform sends a notification 1116 to the store that the coupon code is not valid. The store receives 1118 the information and verifies 1120 that the coupon code is not valid.

If the coupon code is valid 1115, the next step 1117 for the user is to receive 1119 the information and the store arranges 1121 for product delivery. This concludes the process for the store and for the user or customer. For the coupon platform 1117, the next step is to mark the coupon 1131 as redeemed, and at the end of the day 1133, credit 1135 the D for Discount stores with the proper credit. The coupon platform then notifies 1137 the stores of their credit, consolidates 1139 the redemptions, and performs 1140 a reconciliation process at the end of the month or other suitable accounting period.

It will be apparent to those skilled in the art that various modifications and variations can be made to the disclosed virtual coupon system. Other embodiments will be apparent to those skilled in the art from the consideration of the specification and practice of segmentation and distribution, for example by making using other parameters when seeking consumers or users for the coupons of the provider. It is intended that the specification and examples be considered as exemplary only, with a true scope being indicated by the following claims and their equivalents.

There is thus disclosed disbursement of promotional coupons for items such as consumer goods, financial resources, insurance resources, services, and the like, that include a unique password that must be registered by the user to use the coupon and presented at a point of sale to redeem the item.

There are many embodiments according to the present disclosure, of which only a few are described herein. One aspect of the present disclosure is a network resource disbursement system. The system includes a network resource registry including resource configuration data associated with a network resource, the resource configuration data including a target audience code including target audience criteria for disbursing a coupon associated with the network resource to a target audience and a password associated with the coupon for accessing the network resource. The network user registry also includes user configuration data associated with a user, the user configuration data including user criteria for matching with the target audience criteria for determining whether to disburse the coupon associated with the network resource to the target audience. The registry also includes an authorization server configured for (i) receiving a user request for a coupon, (ii) matching the received user criteria with the target audience criteria; and (iii) transmitting a coupon including a unique password based upon a match of the received user criteria and the target audience criteria. The authorization server is further configured for (iv) receiving a request for registration of the unique password of the coupon with the user, and the authorization server being further configured for (v) receiving a request for validation of the unique password of the coupon, and (vi) authorizing the user to access the network resource associated with the coupon upon validation of the unique password.

In another embodiment, the system described above further includes a coupon solicitation module (e.g., computing device 124 in FIG. 1A) configured for initiating the user request for the coupon and receiving the coupon including the unique password, a coupon registration module (e.g., computing device 126 in FIG. 1A) configured to transmit the unique password of the coupon to the authorization server to register the coupon with the user, and a coupon validation module (e.g., the computing device at kiosk 111 in FIG. 1A) for requesting validation from the authorization server of a user to access the network resource associated with the coupon based upon the unique password of the coupon and a unique identifier of the user. In one embodiment the coupon solicitation module is a web browser configured to communicate with the authorization server. The coupon registration module may be a computing device selected from the group consisting of a mobile device, laptop, tablet, and personal computer. In some embodiments, the coupon registration module is a wireless device. In some embodiments, the coupon validation system is a computing device selected from the group consisting of a mobile device, laptop, tablet, and personal computer. In some embodiments, the coupon validation module is a wireless device configured for communication with the authorization server via a wireless communication medium consisting of cellular and WiFi communication medium.

In embodiments, the coupon validation module is a wireless device configured for communication with the authorization server via cellular communication medium. In some embodiments, the communication of the coupon validation module with the authorization server occurs over SMS text messaging service. In some embodiments, the coupon validation module is provided with a J2ME application for reading and redeeming coupons. In other embodiments, the coupon validation module is provided with a USSD application for reading and redeeming coupons. In embodiments, a computing device for generating the coupon is associated with the network resource and the password is associated with the coupon for accessing the network resource. In some embodiments, the registry further includes an archive server configured for retaining copies of the data transmitted for a specified period.

Another aspect of the disclosure is a method for disbursing resources. The method includes steps of receiving a user request for a coupon, the user request including user criteria, matching the received user criteria with a target audience criteria and transmitting a coupon to a user, the coupon including a unique password based upon a match of the received user criteria and the target audience criteria. The method also includes steps of receiving a request for registration of the unique password of the coupon with the user, receiving a request for validation of the unique password of the coupon and authorizing the user to access the network resource associated with the coupon upon validation of the unique password. In embodiments, the coupon is associated with a network resource to a target audience and a password associated with the coupon for accessing the network. In some embodiments, the network resource is selected from the group of network resources consisting of goods, services and credit. In embodiments, the network resource is a credit for a purchase of a good or service or for paying past bills of a vendor.

Another aspect of the present disclosure is a method for generating and redeeming coupons. The method includes a step of configuring a computing device with a network resource registry, the network resource registry including resource configuration data associated with a network resource, the resource configuration data including a target audience code including target audience criteria for disbursing a coupon associated with the network resource to a target audience and a password associated with the coupon for accessing the network resource. The method also includes steps of establishing on the registry a network of consumer users including user configuration data associated with a user, the user configuration data including user criteria for matching with the target audience criteria for determining whether to disburse the coupon associated with the network resource to the target audience, preparing a plurality of coupons for transmission to a user upon request for a coupon, the user request including user criteria, transmitting to the user the coupon including a unique password based upon a match of the received user criteria and the target audience criteria, presenting the coupon having the unique identification to a kiosk for redemption and authorizing the user to access the network resource associated with the coupon upon validation of the unique password. In some embodiments, the transmission of the coupon is accomplished by a push method of unsolicited distribution. In some embodiments, the step of transmission of the coupon is accomplished by a method selected from the group consisting of e-mail distribution and SMS (short message service) distribution.

The above description is intended to be descriptive and illustrative rather than limiting of the present disclosure. Many other embodiments are possible with the coupon and resource system described above. The computer hardware and software discussed is also not intended to be limiting and may accomplished in many ways using standard hardware with non-transitory programming or programmed instructions to accomplish the steps disclosed herein.

What is claimed is:

1. A network resource disbursement system comprising:
- a coupon generator configured to generate a plurality of coupons, wherein:
  - each coupon comprises a unique code, is associated with provision of one of a plurality of network resources, and is associated with a unique password; and
  - each network resource is provided by one of a plurality of vendors; and
- an authorization server communicatively coupled to the coupon generator, and configured to:
  - receive, from a first device associated with a customer and via a first network, a request for one of the plurality of coupons;
  - transmit, to the first device via the first network, the unique code and the unique password of a coupon of the plurality of coupons;
  - receive, from a second device associated with a vendor and via a second network, a registration request to validate the coupon that comprises an identifier and a password indicated to be associated with the coupon;
  - determine, at the authorization server, whether the coupon is valid based on the identifier and the password of the registration request;
  - transmit, to the first device via the first network and to the second device via the second network, an indication of the coupon validity determination; and
  - in response to the coupon having been determined to be valid, the authorization server is further configured to:
    - receive, from the second device via the second network, an indication of whether the coupon has been redeemed;
    - relay, to the first device via the first network, the indication of whether the coupon has been redeemed; and
    - in response to the coupon having been redeemed, relay to the second device via the second network, the indication of the coupon as having been redeemed.

2. The system of claim 1 further comprising:
- a coupon solicitation module of the first device configured to initiate the request for the coupon and to receive the unique code and the unique password of the coupon; and
- a coupon registration module of the second device configured to transmit the unique code and the unique password of the coupon to the authorization server to register the coupon.

3. The system of claim 2 wherein the coupon solicitation module is a web browser executed on the first device and configured to communicate with the authorization server.

4. The system of claim 2 wherein the second device is provided with a J2ME application for reading and redeeming coupons.

5. The system of claim 2 wherein the second device is provided with a USSD application for reading and redeeming coupons.

6. The system of claim 2 wherein the coupon solicitation module is a client application downloaded onto the first device.

7. The system of claim 1 wherein each of the first device and the second device comprises a computing device selected from a group consisting of a mobile device, laptop, tablet, and personal computer.

8. The system of claim 1 wherein at least one of the first device and the second device comprises a wireless device configured for communication with the authorization server via cellular communication medium.

9. The system of claim 8 wherein communication of the at least one of the first device and the second device with the authorization server occurs over SMS text messaging service.

10. The system of claim 1 further comprising an archive server communicatively coupled to the authorization server, and configured for retaining copies of data transmitted and received by the authorization server over a specified period.

11. The system of claim 1 wherein the transmission of the unique code and the unique password by the authorization server to the first device comprises a transmission of a barcode that comprises the unique code and the unique password to enable the first device to display the barcode.

12. The system of claim 11 wherein:
- the second device optically scans the barcode from the display of the barcode by the first device to obtain the unique code and the unique password; and
- the reception of the registration request from the second device by the authorization server comprises the reception of the unique code and the unique password as optically scanned by the second device.

13. The system of claim 1 wherein the network service is selected from a group consisting of Internet access service and a network-based information service.

14. A method for disbursing resources comprising:

generating a plurality of coupons, wherein:

each coupon comprises a unique code, is associated with provision of one of a plurality of network resources, and is associated with a unique password; and each network resource is provided by one of a plurality of vendors; and receiving, at an authorization server, and from a first device associated with a customer and via a first network, a request for one of the plurality of coupons;

transmitting, from the authorization server, and to the first device via the first network, the unique code and the unique password of a coupon of the plurality of coupons;

receiving, at the authorization server, and from a second device associated with a vendor and via a second network, a registration request to validate the coupon that comprises an identifier and a password indicated to be associated with the coupon;

determining, by the authorization server, whether the coupon is valid based on the identifier and the password of the registration request;

transmitting, from the authorization server, and to the first device via the first network and to the second device via the second network, an indication of the coupon validity determination; and in response to the coupon having been determined to be valid, performing further operations comprising:

receiving, at the authorization server, and from the second device via the second network, an indication of whether the coupon has been redeemed;

relaying, from the authorization server, and to the first device via the first network, the indication of whether the coupon has been redeemed; and in response to the coupon having been redeemed, relaying, from the authorization server, and to the second device via the second network, the indication of the coupon as having been redeemed.

15. The method of claim 14, wherein the transmission of the unique code and the unique password from the authorization server to the first device is accomplished by a push method of unsolicited distribution.

16. The method of claim 15, wherein the step of transmission of the unique code and the unique password from the authorization server to the first device is accomplished by a method selected from a group consisting of e-mail distribution and SMS (short message service) distribution.

17. The method of claim 14, wherein each of the first device and the second device comprises a computing device selected from a group consisting of a mobile device, laptop, tablet, and personal computer.

18. The method of claim 14, wherein at least one of the first device and the second device comprises a wireless device configured for communication with the authorization server via cellular communication medium.

19. The method of claim 14, wherein transmitting the unique code and the unique password, by the authorization server to the first device, comprises transmitting a barcode that comprises the unique code and the unique password to enable the first device to display the barcode.

20. The method of claim 19, wherein:

the second device optically scans the barcode from the display of the barcode by the first device to obtain the unique code and the unique password; and receiving the registration request from the second device, by the authorization server, comprises the receiving the unique code and the unique password as optically scanned by the second device.

* * * * *